United States Patent
Sasaki et al.

[11] Patent Number: 6,134,488
[45] Date of Patent: Oct. 17, 2000

[54] METHOD AND DEVICE FOR DIAGNOSIS FOR VEHICLE

[75] Inventors: Kazumune Sasaki; Akira Hashimoto, both of Saitama, Japan

[73] Assignee: Honda Giken Kogyo Kabushiki Kaisha, Tokyo, Japan

[21] Appl. No.: 09/147,144

[22] PCT Filed: Mar. 10, 1998

[86] PCT No.: PCT/JP98/00975

§ 371 Date: Oct. 16, 1998

§ 102(e) Date: Oct. 16, 1998

[87] PCT Pub. No.: WO98/40715

PCT Pub. Date: Sep. 17, 1998

[30] Foreign Application Priority Data

Mar. 10, 1997 [JP] Japan ................................. 9-070910

[51] Int. Cl.$^7$ ........................... G01M 17/00; G01M 15/00
[52] U.S. Cl. ................................................. 701/31; 701/33
[58] Field of Search ................................. 701/29, 31, 33; 73/117.2, 117.3

[56] References Cited

U.S. PATENT DOCUMENTS

| | | | |
|---|---|---|---|
| 4,267,569 | 5/1981 | Baumann et al. | 364/431 |
| 4,831,560 | 5/1989 | Zaleski | 701/33 |
| 5,214,582 | 5/1993 | Gray | 701/33 |
| 5,798,647 | 8/1998 | Martin et al. | 324/503 |

FOREIGN PATENT DOCUMENTS

| | | |
|---|---|---|
| 61-25091 | 6/1986 | Japan . |
| 2-8728 | 1/1990 | Japan . |
| 2-275336 | 11/1990 | Japan . |
| 3-139094 | 6/1991 | Japan . |
| 4-238241 | 8/1992 | Japan . |
| 7-43255 | 2/1995 | Japan . |
| 7-33983 | 4/1995 | Japan . |

*Primary Examiner*—Michael J. Zanelli
*Attorney, Agent, or Firm*—Armstrong, Westerman, Hattori, McLeland & Naughton

[57] ABSTRACT

Forced activation signal supplier 550 supplies a forced activation signal Sx to a diagnostic target part 101 related to a diagnostic item requiring a forced activation signal. Vehicle-state detector 552 detects a current state of the diagnostic target part 101 through an ECU 1. Diagnostic element 553 compares the currently detected state of the diagnostic target part 101 with a state predicted when the forced activation signal Sx is given to diagnose the diagnostic target part 101. When the forced activation signal Sx is supplied to the part of the vehicle, self-diagnosis stopping element 554 gives an instruction to stop a self diagnosis for at least an item the diagnostic result of which may vary under the influence of the forced activation signal Sx, or to invalidate the diagnostic result.

5 Claims, 16 Drawing Sheets

| ECU CODE | DIAGNOSTIC ITEM | | | | | | |
|---|---|---|---|---|---|---|---|
| | 01 | 02 | 03 | 04 | 05 | 06 | .... |
| ○△×□ | 1 | 1 | 0 | 0 | 1 | 1 | .... |
| ××△□ | 1 | 0 | 0 | 0 | 0 | 1 | .... |
| ○○△□ | 1 | 1 | 0 | 0 | 0 | 1 | .... |
| ⋮ | ⋮ | ⋮ | ⋮ | ⋮ | ⋮ | ⋮ | ⋮ |
| ○△□× | 1 | 1 | 1 | 0 | 1 | 1 | .... |

71

| ECU CODE | NID-ref |
|---|---|
| ○△×□ | 700 |
| ××△□ | 710 |
| ○○△□ | 640 |
| | |
| ○△□× | 650 |

74

FIG. 5
| CODE NAME | CODE | STANDARD DATA/UNIT |
|---|---|---|
| NUMBER OF TIMES OF IDLING DIAGNOSES | CID-ref | x1 (TIMES) |
| REFERENCE VEHICLE SPEED | VSref | x2 (Km/h) |
| TOLERANCE | NID-TRC | x3 (RPM) |
| REFERENCE IDLING MEASUREMENT TIME | MID-ref | x4 (sec) |
| STANDBY MODE STARTING CONDITION | Tss-ref | x5 (min) |
~73
FIG. 6A
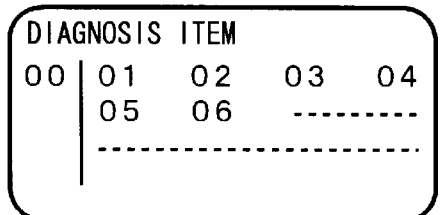
FIG. 6D
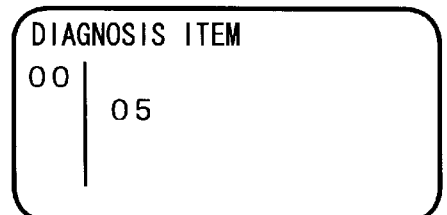
FIG. 6B
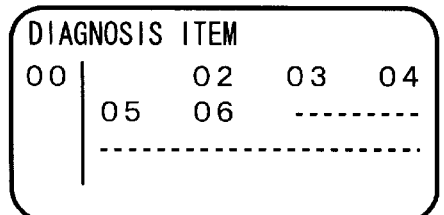
FIG. 6E
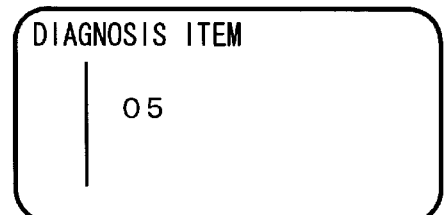
FIG. 6C
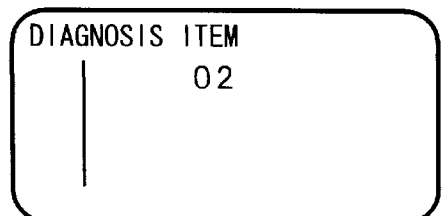
FIG. 6F
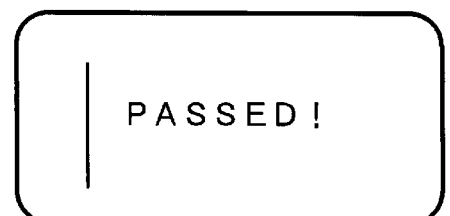

6,134,488

METHOD AND DEVICE FOR DIAGNOSIS FOR VEHICLE

TECHNICAL FIELD

This invention relates to vehicle diagnostic method and apparatus, and in particular, to the vehicle diagnostic method and apparatus capable of preventing a vehicle-mounted self-diagnostic function from causing a wrong diagnosis result even when an external diagnostic apparatus supplies a particular part of a vehicle to be diagnosed with a forced activation signal to forcibly actuate the particular part, which diagnostic apparatus communicates with an electronic control unit mounted on the vehicle to diagnose the vehicle.

BACKGROUND ART

To improve engine control functions, an electronic control unit (ECU) with a microcomputer has been used in recent years for executing control programs, such as control of ignition timing in an engine, control of valve opening and closing timing, and/or control of fuel injection in an electronic fuel injector (EFI) for an automobile (hereinafter, referred to as a "vehicle"). The ECU is connected to sensors, such as a temperature sensor for detecting a temperature of engine cooling water, an engine-speed sensor for detecting an engine speed, a vehicle-speed sensor for detecting a vehicle speed, an O2 sensor for detecting an oxygen concentration in exhaust gas, and various switches including a brake switch for detecting that a driver has stepped on a brake pedal. The ECU thus executes various kinds of controls based on detection signals output from the sensors and others.

On the production line where vehicles with such an ECU are manufactured, in the final test process after assembled, it should be diagnosed whether or not each sensor and the like, and the ECU itself functions normally. For example, Japanese patent publication No. Hei 3-59372 proposes a diagnostic method in which a diagnostic apparatus with a microcomputer executes a vehicle diagnostic program to diagnose a desired diagnostic item at a scheduled time.

In a failure diagnosis related to a plurality of diagnostic items, for example, as disclosed in Japanese patent publication No. Sho 61-25091, the plurality of diagnostic items are diagnosed in predetermined order and the results of pass/failure or displayed judgment in respective diagnostic items are output one by one on a display device.

Some of such vehicle diagnostic items, such as an "Ne Diagnosis" to determine whether or not an engine speed Ne at idling time is in a given range, and a "Brake Switch Diagnosis" to diagnose an opening and closing function of a brake switch, can be executed in a relatively easy way in an inspection process. The inspection process under limited conditions, however, makes it difficult to realize actually effective running conditions for some other diagnoses such as one to diagnose a function for controlling valve opening and closing timing in accordance with predetermined parameters, e.g., the vehicle running speed and/or the engine speed, and one to diagnose an evaporation system for collecting fuel gas evaporated from a fuel tank and supplying it to the engine when predetermined operating conditions are satisfied (hereinafter, referred to as an "EVP Diagnosis"). For diagnoses related to such diagnostic items, a diagnostic technique may be considered in which the ECU supplies a forced activation signal to each associated part to forcibly actuate the valve or evaporation system so as to diagnose it as being good or bad based on whether or not an actually obtained (or observed) state of the valve or evaporation system is in a state predicted corresponding to the forced activation signal.

On the other hand, recent ECUs are equipped with respective self-diagnostic functions. When such a self-diagnostic function detects an out-of-range abnormal signal at its input terminal with which various sensors are connected, it regards the vehicle as having trouble with a corresponding part, and stores in a memory a code (failure code) for identifying the part from which the abnormal signal is output and the value of the abnormal signal (failure data). The failure code and data can be read from the ECU using a special-purpose device at an auto repair shop for determination of the state and contents of the failure.

In a vehicle with such a self-diagnostic function mounted thereon, for example, when the evaporation system supplies the engine with fuel collected in a canister in response to the forced activation signal irrespective of the normal control procedure, the O2 sensor for detecting an oxygen concentration in exhaust gas may show an abnormal value, or there may be a misfiring. This causes a problem that the self-diagnostic apparatus may wrongly diagnose a self-diagnostic item using such a detected value as a wrong parameter.

DISCLOSURE OF INVENTION

It is an object of the present invention to provide vehicle diagnostic method and apparatus capable of preventing a vehicle-mounted self-diagnostic function from wrongly diagnosing a self-diagnostic item based on an actual state of a corresponding part of the vehicle even in a case where the part shows a state different from a normal state when an external diagnostic apparatus supplies the part with such a forced activation signal as to forcibly actuate the part.

The present invention is characterized as follows:

(1) In a vehicle diagnostic method for supplying a forced activation signal from the outside to predetermined parts of a vehicle provided with a self-diagnostic function to make external diagnoses based on whether or not an actually detected state of the vehicle is in a state predicted corresponding to the forced activation signal, a self diagnosis for at least an item or items the diagnostic result of which may vary under the influence of the forced activation signal is inhibited diring the external diagnoses.

(2) In a vehicle diagnostic apparatus for supplying a forced activation signal from the outside to predetermined parts of a vehicle provided with a self-diagnostic function to make external diagnoses independent of self diagnoses based on whether or not an actually detected state of the vehicle is in a state predicted corresponding to the forced activation signal, the apparatus comprises forced activation signal supplying means for supplying a forced activation signal to a diagnostic target part related to a corresponding diagnostic item; state detection means for detecting a current state of the diagnostic target part; diagnostic means for comparing the currently detected state of the diagnostic target part with a state predicted when the forced activation signal is supplied thereto to diagnose the target part; and self-diagnosis inhibition instruction means for giving an instruction to inhibit a self diagnosis during supplying of the forced activation signal.

(3) In a diagnostic apparatus mounted on a vehicle for diagnosing each part of the vehicle, the apparatus comprises self-diagnosis inhibition means for stopping at least a self diagnosis for an item the diagnostic result of which can vary under the influence of the forced activation signal during a forced activation signal is input from the outside of the vehicle so that a part of the vehicle is forcibly actuated for an external diagnosis.

According to the vehicle diagnostic method and apparatus thus configured, when an external diagnostic apparatus supplies such a forced activation signal as to forcibly actuate a part of the vehicle for an external diagnosis, and the part is expected to be actuated in a way different from a normal state, a self diagnosis related to the part expected to be actuated in the different way can be stopped, thereby preventing a self-diagnostic apparatus from causing a wrong diagnostic result due to the forced activation signal.

BRIEF DESCRIPTION OF DRAWINGS

FIG. 5 is a diagram showing the contents of a standard data storage area 73;

FIGS. 6A–F are diagrams each showing exemplary results of diagnosis indicated on a display 27;

BEST MODE FOR EMBODYING THE INVENTION

Figure 1:
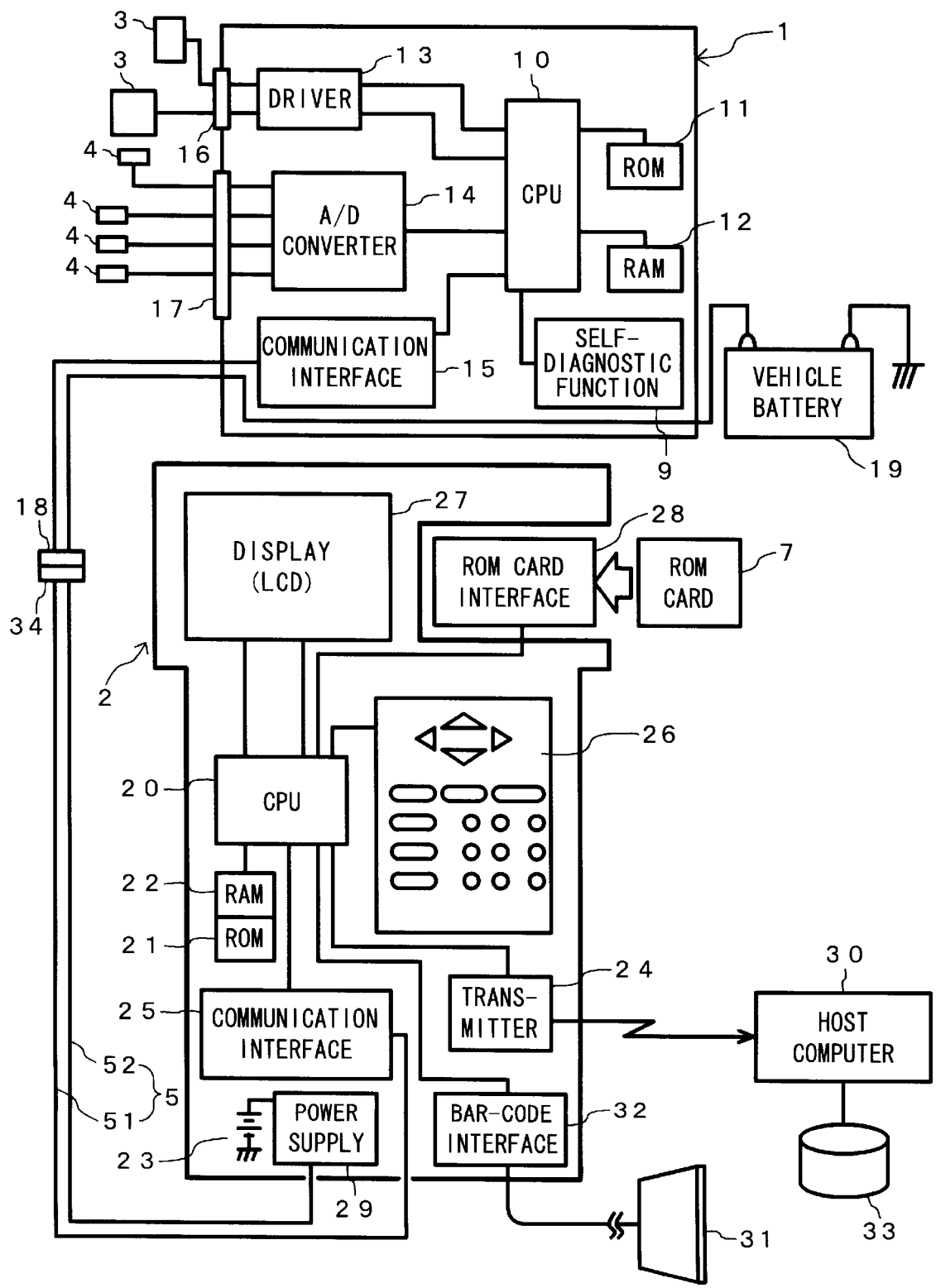
FIG. 1 is a block diagram showing a configuration of an ECU 1 mounted on a vehicle to be diagnosed and a vehicle diagnostic apparatus 2 according to the present invention.

Referring now to the drawings, the present invention will be described in detail below.

In FIG. 1, the ECU 1 is constituted of a CPU 10, a ROM 11, a RAM 12, a driver 13, an A/D converter 14, and a communication interface 15. The ECU 1 is connected to peripherals devices through connectors 16 and 17. For example, actuators 3 are connected with the connector 16, while various types of sensors and switches 4 are connected with the connector 17. The ECU 1 is also connected by a connector 18 to a communication cable 5 of the vehicle diagnostic apparatus 2 through a connector 34.

Signals from each sensor 4 or the like are input to the ECU 1. In the ECU 1, the signals are converted by the A/D converter 14 into digital signals and read into the CPU 10. The signals read in the CPU 10 are processed with control data stored in the ROM 11 and the RAM 12 according to a control program stored in the ROM 11. The CPU 10 provides a command signal to the driver 13 in accordance with the processing result. The driver 13 provides power for each actuator 3 in response to the command signal input. The ROM 11 stores not only the program but also identification codes or ECU codes assigned to each individual ECU 1.

The vehicle diagnostic apparatus 2 according to the present invention is constituted of a CPU 20, a ROM 21, a RAM 22, a transmitter 24, a communication interface 25, and a power source 29. By the power supply 29, either a vehicle battery 19 mounted on the vehicle to be diagnosed or an internal battery 23 is selected as a power supply of the vehicle diagnostic apparatus 2. The vehicle diagnostic apparatus 2 is also provided with a keyboard 26 for input of operator's instructions, a display 27 for displaying processing results of the CPU 20, a bar-code reader 31 for reading identification bar-codes, and a bar-code interface 32. In the present embodiment, a back-lighted liquid crystal display panel (LCD) is used as the display 27. Further, the keyboard 26 includes typical ten keys, cursor navigation keys, and some function keys.

The communication cable 5 is constituted of a signal line 51 and a power-supply line 52. The communication interface 15 of the ECU 1 and the communication interface 25 of the vehicle diagnostic apparatus 2 are connected through the signal line 51 so that two-way digital communications can be established between the CPU 10 and the CPU 20. When connecting the communication cable 5 to the ECU 1, the power supply 29 provides the vehicle diagnostic apparatus 2 with power supplied by the vehicle battery 19 through the power-supply line 52, and simultaneously charges the internal battery 23.

As described later in detail, the vehicle diagnostic apparatus 2 is started or activated by the operator turning on a power supply key switch (not shown) on the keyboard 26, or connecting a connector 34 of the communication cable 5 to the connector 18 of the ECU 1 without operation of the power supply key switch. The vehicle diagnostic apparatus 2 after activated acts in different ways depending on which starting operation is done by the operator.

The ROM 21 stores a basic program for controlling the vehicle diagnostic apparatus 2, and associated control data. On the other hand, the ROM card 7 stores individual information to which a new information may be added and or which may be changed when manufacture a new type of car or the like, such as unique data used for each diagnosis routine and the vehicle diagnostic program. Data of the ROM card 7 are read into the CPU 20 through a ROM card interface 28.

Signals read from the ECU 1 are processed based on the basic data stored in the ROM 21 and the RAM 22, and the control data and the vehicle diagnostic program stored in the ROM card 7. The processing results, that is, the diagnostic results are temporarily stored into the RAM 22. The diagnostic results are output to the display 27 whenever the diagnosis of each vehicle is finished. The operator then causes the vehicle diagnostic apparatus 2 to transmit the data on the diagnostic results of several vehicles from the transmitter 24 to a host machine, such as a host computer 30, so as to be centrally controlled by the host computer 30 and stored in a mass storage device 33. Otherwise, the vehicle diagnostic apparatus 2 may be connected to an unillustrated personal computer that provides necessary information, such as an updated (version-up) failure diagnostic program, to the vehicle diagnostic apparatus 2.

Figures 2, 3, 4:
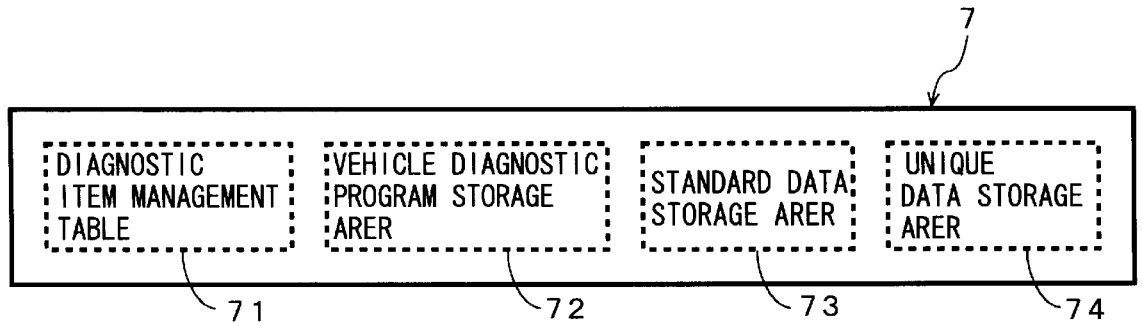
FIG. 2 is a schematic diagram showing the contents of a ROM card 7.
FIG. 3 is a diagram showing the contents of a diagnostic item management table 71.
FIG. 4 is a diagram showing the contents of a unique data storage area 74.

As shown in FIG. 2, the ROM card 7 contains a diagnostic item management table 71 for use to select diagnostic items unique to engine type according to the ECU code, a vehicle diagnostic program storage area 72 for storing a vehicle diagnostic program related to a plurality of diagnostic items, a standard data storage area 73 for storing standard data commonly used for a plurality types of the vehicles irrespective of the type of the ECU mounted thereon, and a unique data storage area 74 for storing unique data the contents of which may vary according to each individual ECU.

FIG. 3 shows exemplary contents of the diagnostic item management table 71. The vehicle diagnostic apparatus 2 according to the present invention is able to diagnose various diagnostic items. Although the vehicle diagnostic apparatus 2 includes all algorithms for respective diagnostic items, since all of the items are not always diagnosed for every vehicles, that is, since the items to be diagnosed for each vehicle are usually different, each item in the management table 71 has an entry "1 (selected)" or "0 (not-selected)" for each ECU code. As an example, for a vehicle having an ECU code "○Δ×□" in FIG. 3, diagnostic items 1, 2, 5, 6, . . . are selectively diagnosed and the other items are not diagnosed.

FIG. 4 shows the contents of the unique data storage area 74. In the present embodiment, the unique data storage area stores unique data the contents of which may vary according to each individual ECU (ECU code), such as an individual reference idling speed NID-ref registered in accordance with each individual ECU code. As described later in detail, the individual idling speed NID-ref denotes a reference engine speed or RPM when the engine is idling, which varies according to each individual ECU code. Therefore, the individual idling speed NID-ref relative to the individual ECU code of the vehicle to be diagnosed is compared with a detected engine speed Ne to diagnose whether the engine speed in the idling state is normal or abnormal.

In the present embodiment, different diagnostic routines, that is, a combination of diagnostic items, and associated unique data are automatically determined according to each individual ECU code, so that the operator is released from selecting operation of the diagnostic items and setting operation of the unique data. This reduces the operator load; besides, it increases the accuracy of each diagnosis because an error in selection of the diagnostic items and unique data is eliminated.

FIG. 5 shows the contents of the standard data storage area 73. The standard data storage area 73 contains standard data x1 to x5 commonly used in respective diagnostic processings of the diagnostic program irrespective of the ECU code.

Figure 8:
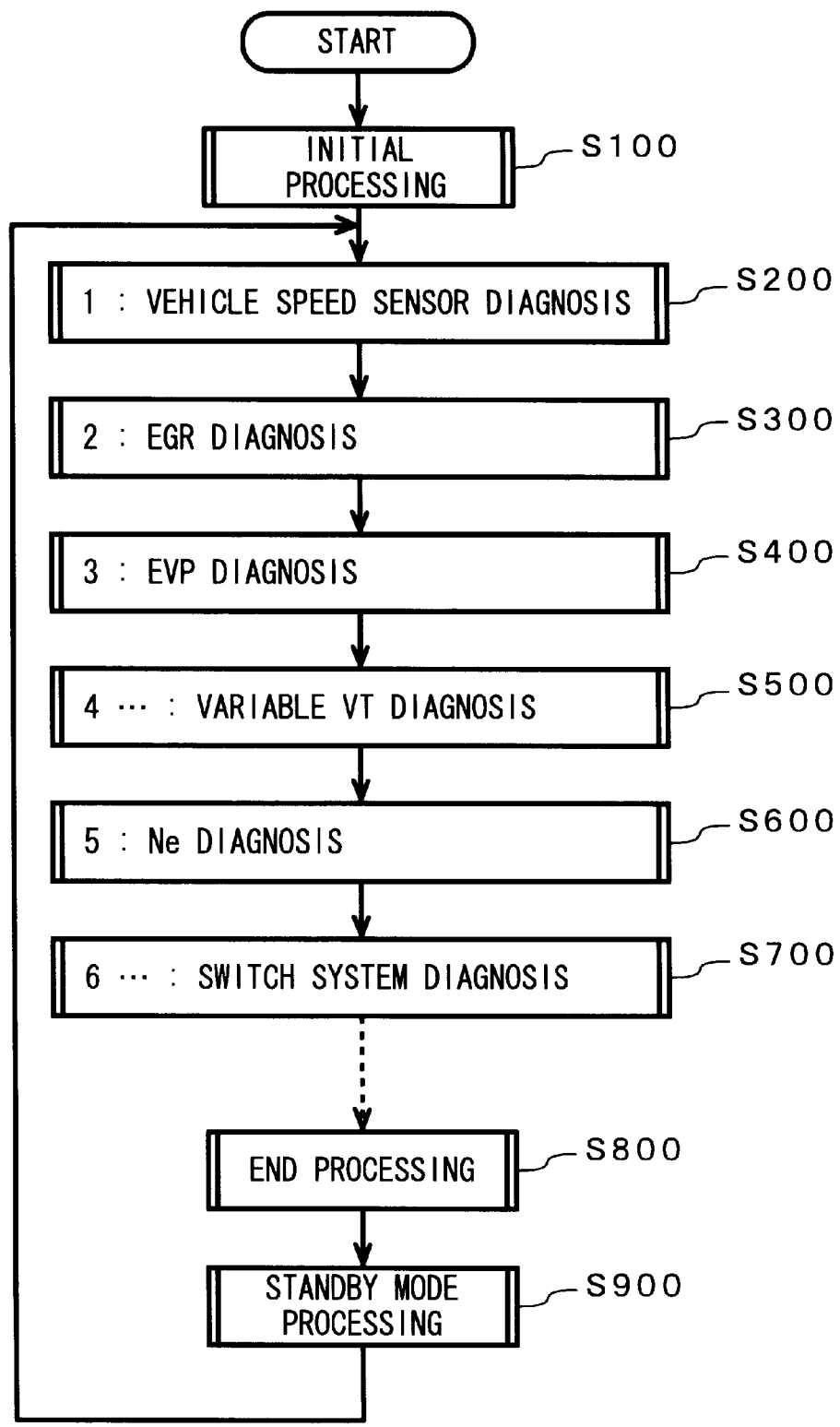
FIG. 8 is a flowchart showing a main flow of a vehicle diagnostic program according to the present invention.

Next, operation of the present embodiment will be described with reference to flowcharts. FIG. 8 is a flowchart showing a main flow of a vehicle diagnostic program executed by the vehicle diagnostic apparatus according to the present invention. Although the vehicle diagnostic apparatus according to the present invention can be used for vehicle diagnosis under any environments, such as on the production line or at an auto repair shop, the present embodiment takes a case in which the "Inspection Process" is executed on the production line at a factory, by way of example to describe its operation.

In the present embodiment, a circulating diagnostic method is shown as an example, which circulates plural types of diagnoses repeatedly with a very short cycle irrespective of the pass/fail diagnostic result, and finally diagnoses a diagnostic item or items that remain not passed after a scheduled time has elapsed as being failed. When using such a circulating diagnostic method, if the diagnostic cycle is set such that one execution cycle is finished while the operator is stepping on the brake pedal, the "Brake Switch Diagnosis" can be always executed without fail during the braking operation in spite of the sequence and timing of stepping on the brake pedal. This makes it possible to reduce limitations on the sequence and timing of operations to be performed for each diagnostic item, and hence to remarkably improve work efficiency.

In FIG. 8, step S100 executes an "Initial Processing". Step S200 executes a "Vehicle Speed Sensor Diagnosis" registered as a diagnostic item 1. Step S300 executes an "EGR (Exhaust Gas Recirculator) Diagnosis" registered as a diagnostic item 2. Step S400 executes an "EVP (Evaporation) Diagnosis" registered as a diagnostic item 3. Step S500 executes a "variable VT (Valve Timing) Diagnosis" registered as a diagnostic item 4. Step S600 executes an "Ne Diagnosis" registered as a diagnostic item 5. Step S700 executes a "Switch System Diagnosis", in which each of switches registered as diagnostic items 6, 7, . . . . . are diagnosed. Step S800 executes an "End Processing" and step S900 executes a "Standby Mode Processing". After the step S900, the program returns to the step S200 and the sequence of every diagnosis routines is repeated until all the diagnostic items are concluded, or until the process is stopped with a command of an operator or the like.

The vehicle diagnostic apparatus according to the present invention is thus designed to repeat a plurality of diagnoses related to various diagnostic items automatically during given execution cycles. Hereinbelow, each diagnostic method and processing method of each items will be described in detail.

Figure 9:
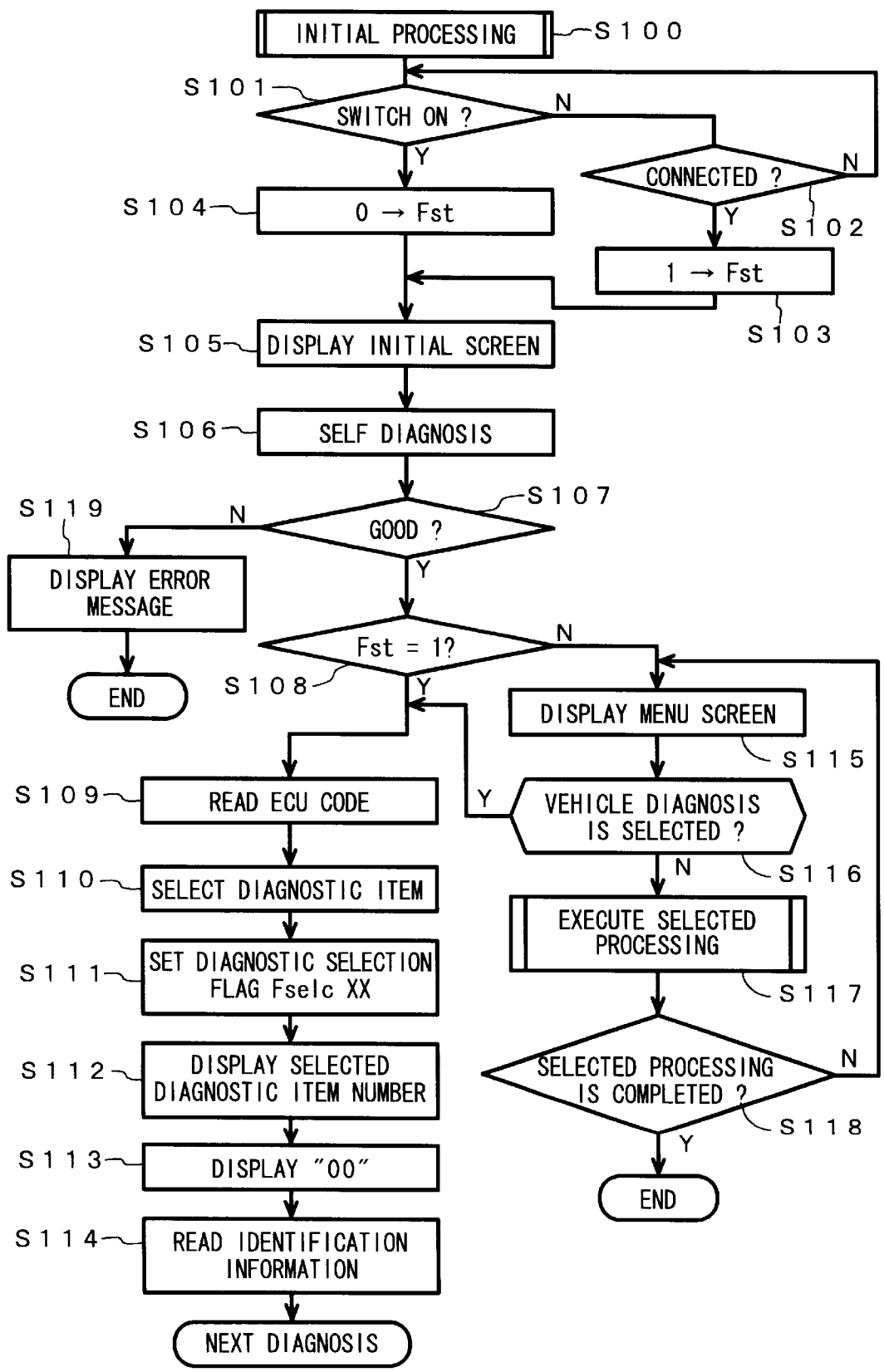
FIG. 9 is a flowchart showing an operation of an initial processing.

FIG. 9 is a flowchart showing an operation of the "Initial Processing" in step S100. As previously described, the vehicle diagnostic apparatus 2 according to the present invention is started or activated by the operator either turning on a power-supply switch on the keyboard 26, or connecting the communication cable 5 to the ECU 1. Therefore, the initial processing first determines which procedure is used for the power input.

Step S101 in FIG. 9 determines whether or not the power is supplied to the vehicle diagnostic apparatus 2 by turning on the power-supply switch. If the judgement is affirmative, a flag Fst representing a power-on procedure is set to "1" in step S104. In this case, the internal battery 23 provides power for the vehicle diagnostic apparatus 2. If the judgement at step S104 is negative, step S102 determines whether or not the communication cable 5 has been connected to the vehicle (ECU 1). If it is affirmative, the flag Fst is set to "1" in step S103. In this case, the vehicle battery 19 provides power for the vehicle diagnostic apparatus 2.

When detecting either the power input by the switch or the power input by the cable connection, step S105 makes the display 27 show an initial image on its screen. Then, step S106 executes a self diagnosis for checking the abnormality or failure of the vehicle diagnostic apparatus 2 itself. When the result of the self-diagnosis is judged in step S107 to be passed, the program advances to step S108. If judged to be bad, step S119 makes the display 27 indicate an error message and the processing halts.

The step S108 checks the flag Fst to determine whether the subsequent processing to be executed should be selected by the operator from the menu image, or a predetermined, specific processing should automatically be executed. In the case where the flag Fst is "1", i.e., the power has been supplied by the cable connection, the "Vehicle Diagnosis" as predetermined particular process is started immediately according to the predetermined program without showing the menu screen on the display 27. The program then advances to step S109, in which the ECU code registered in the ECU 1 is read. Step S110 retrieves the diagnostic item management table 71, previously discussed with reference to FIG. 3, based on the ECU code thus read out, to select diagnostic items to be executed. Step S111 sets "1 (select)" as diagnostic selection flags Fselc XX (where "XX" is any one of diagnostic item numbers) for each selected diagnostic items, while for "0 (non-select)" for each non-selected diagnostic items.

Step S112 makes the display 27 show a list of the diagnostic item numbers representing the selected diagnostic items. FIG. 6A shows an exemplary image displayed screen on the display 27 when all the diagnostic items have been selected. In other words, FIG. 6A shows all the diagnostic item numbers "01", "02", "03", . . . listed up on the display 27. An indication (left side) of "00" is displayed on the display in the next step S113, and erased when the number of cycle times of the diagnoses or a total time of its execution is enough to finish the diagnostic item 5 of "Ne Diagnosis", as described later in detail. Such an indication is not limited by the number "00", but any alpha numerical letter such as "X" or any other symbol may be used instead of the number "00" as long as it can easily be distinguished from the other diagnostic item numbers.

In step S114, an identification bar code representing an individual and unique information of each vehicle is read by the bar-code reader 31 and temporarily stored in the RAM 22. The identification bar code may be previously printed on a diagnostic record that is provided for each individual vehicle. The bar code may be printed on a label or seal which is to be attached in place to the body of each vehicle instead of printing bar-code on the diagnostic record. Then the processing advances to the next diagnosis that is the "Vehicle Speed Sensor Diagnosis" shown in FIG. 8.

When the flag Fst is set to "0" in the step S108, i.e., when the step S108 determines that the operator has turned on the switch to provide power for the vehicle diagnostic apparatus 2, step S115 makes the display 27 show a menu that requests the operator to select the processing contents. Step S116 identifies the processing contents selected by the operator from the menu. When a "Vehicle Diagnosis" command is selected in step S116, the program advances to the step S109 and the diagnostic processing is started in the same manner as the case the flag Fst is set to "1". When a processing command other than the "Vehicle Diagnosis" command is selected in step S116, step S117 executes the selected other processing. Step S118 determines whether or not an "End" command is selected in the step S116. If the "End" command has been selected, the program executed is ended.

As previously described, the vehicle diagnostic apparatus 2 according to the present invention is designed to vary the operation after power input depending on which power-on procedure is used, the operation of the power switch or the cable connection. When the source power is supplied by the cable connection, the diagnostic processing is started immediately without showing the menu. This allows the operator to start the vehicle diagnostic program automatically in the inspection process, where vehicles to be diagnosed are carried on the production line one after another, by only connecting the cable 5 of the vehicle diagnostic apparatus 2 to each vehicle to be diagnosed, thus simplifying the diagnostic work. On the other hand, when the starting of the vehicle diagnostic apparatus 2 is done by the operator turning on the switch, the menu is displayed on the screen to facilitate the selection of any other processing.

Figure 10:
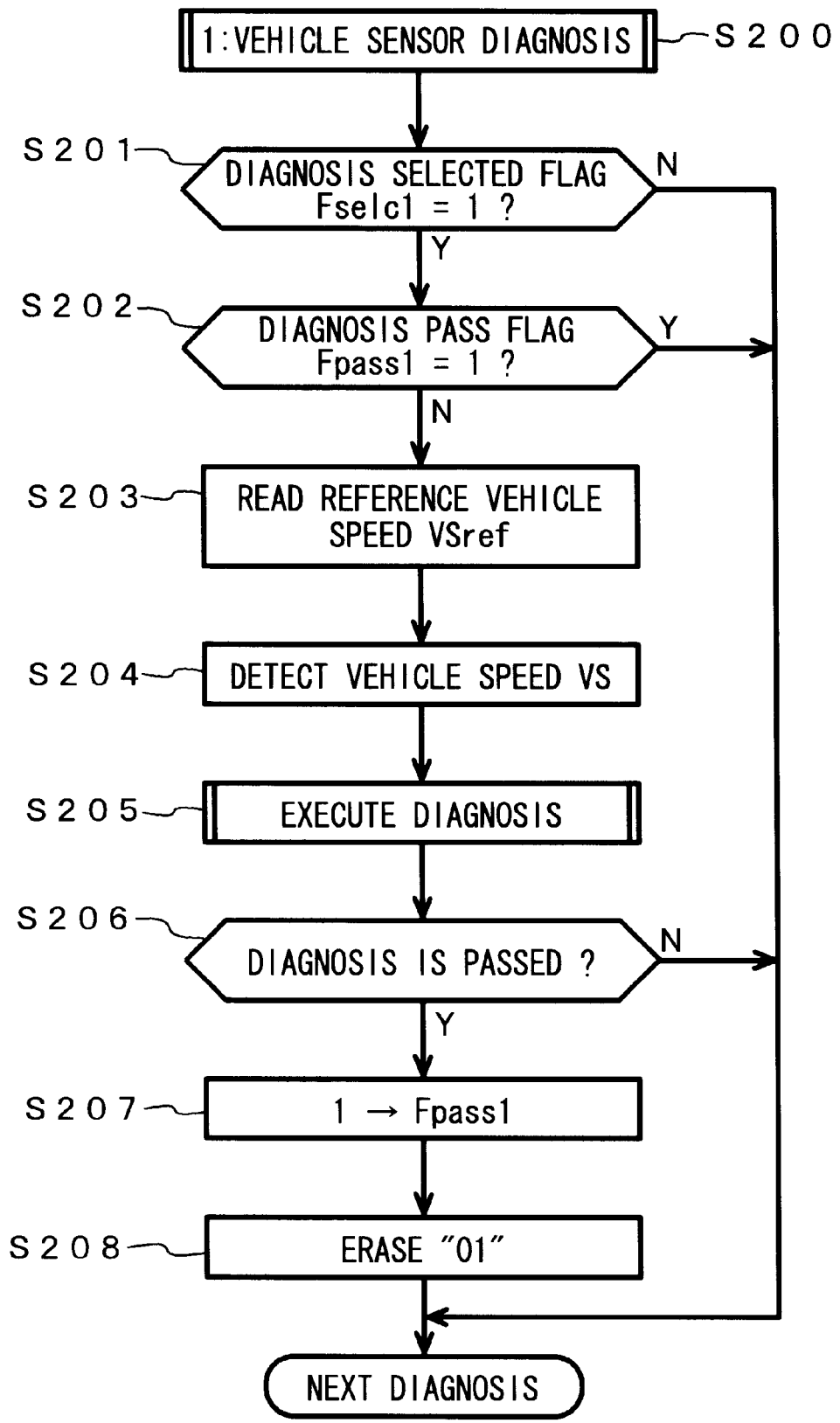
FIG. 10 is a flowchart showing an operation of a vehicle-speed sensor diagnosis.

FIG. 10 is a flowchart showing a method of the diagnostic item 1 "Vehicle Speed Sensor Diagnosis" to be executed by the step S200 of FIG. 8. The "Vehicle Speed Sensor Diagnosis" routine is to diagnose whether or not the sensor for detecting a vehicle speed VS is functioning normally, in which the vehicle speed VS detected by the vehicle speed sensor is compared with a reference value (reference vehicle speed VSref) to diagnose the vehicle speed sensor in a proper known manner in accordance with the comparison result.

Step S201 first determines whether or not the "Vehicle Speed Sensor Diagnosis" routine has been selected based on the value of a diagnostic selection flag Fselc 1 related to the "Vehicle Speed Sensor Diagnosis" routine. If Fselc 1=0, the "Vehicle Speed Sensor Diagnosis" is judged to be non-selected and the program advances to the next diagnosis. If Fselc 1=1, the "Vehicle Speed Sensor Diagnosis" is judged to be selected and the program advances to step S202.

The step S202 determines whether or not the "Vehicle Speed Sensor Diagnosis" has already been passed on the basis of the value of a pass flag Fpass 1 related to said diagnosis. The flag Fpass XX represents whether the diagnostic item XX has been passed or failed. If Fpass 1=1, the diagnostic item 1 is judged to have been passed and the program advances the next diagnosis item. If Fpass 1=0, the diagnostic item 1 is judged not to have been passed yet and the program advances to step S203.

Step S203 reads the reference vehicle speed VSref stored as one of standard data stored in the standard data storage area 73 (FIG. 5) of the ROM card 7, and step S204 detects a current vehicle speed VS through the ECU 1. Step S205 executes the vehicle speed sensor diagnostic routine based on the reference vehicle speed VSref and the detected vehicle speed VS. Step S206 determines whether or not the diagnosis executed in the step S205 is passed. If not passed, the program advances to the next diagnosis item (the "EGR Diagnosis" in the present embodiment) according to the flowchart shown in FIG. 8, and the "Vehicle Speed Sensor Diagnosis" routine is held off until the next diagnostic timing therefor.

If passed, on the other hand, step S207 sets the diagnosis pass flag Fpass 1 to "1". Step S208 erases the diagnostic item number "01" from the display 27. FIG. 6B shows an exemplary image displayed on the display 27 when only the "Vehicle Speed Sensor Diagnosis" has been passed, where only the diagnostic item number "01" has been erased.

Figure 11:
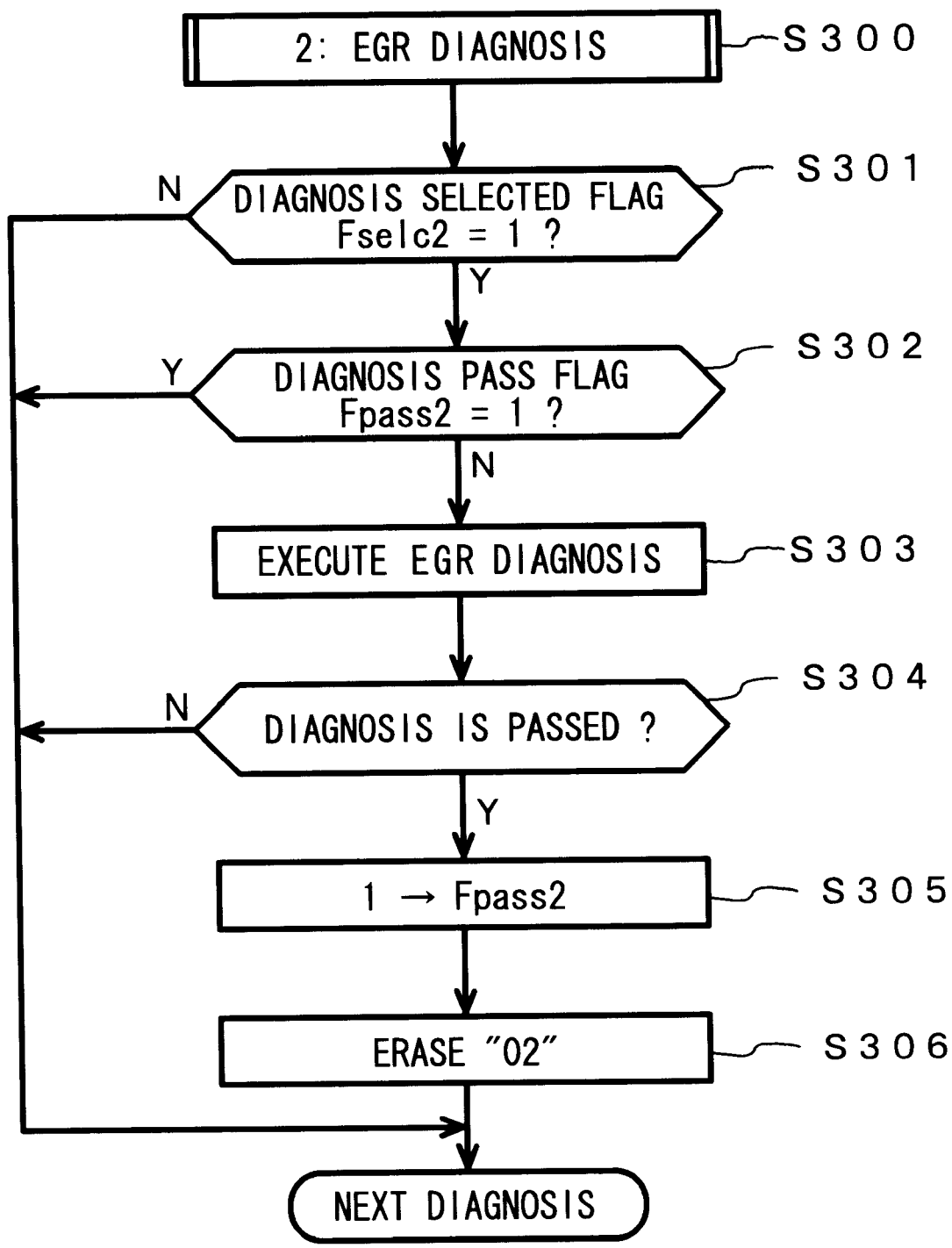
FIG. 11 is a flowchart showing an operation of an EGR diagnosis.

FIG. 11 is a flowchart showing a method of the diagnostic item 2 "EGR Diagnosis" to be executed by the step S300 of FIG. 8. The "EGR Diagnosis" routine is to decide whether or not a device (EGR) to reduce NOx by recirculating exhaust gas into a combustion chamber of the engine normally functions. Such kind of diagnostic technique is well known in the related art.

As similar to the diagnostic processing mentioned above, steps S301 and S302 determine whether or not the diagnostic item 2 has been selected and the diagnosis has been passed based on the values of the diagnostic selection flag Fselc 2 and the diagnostic pass flag Fpass 2 related to the "EGR Diagnosis". If the "EGR Diagnosis" is selected (Fselc 2=1) but not yet be passed (Fpass 2=0), step S303 executes the "EGR Diagnosis" routine in a proper known manner. If step S304 judges the diagnosis to be passed, step S305 sets the diagnostic pass flag Fpass 2 to "1", and step S306 erases the diagnostic item number "02" from the display 27. On the other hand, if not be passed yet, the program advances to the next diagnostic item (the "EVP Diagnosis" in this embodiment) along the flowchart of FIG. 8, and the "EGR Diagnosis" routine is held off until the next diagnostic timing therefor.

Figure 7:
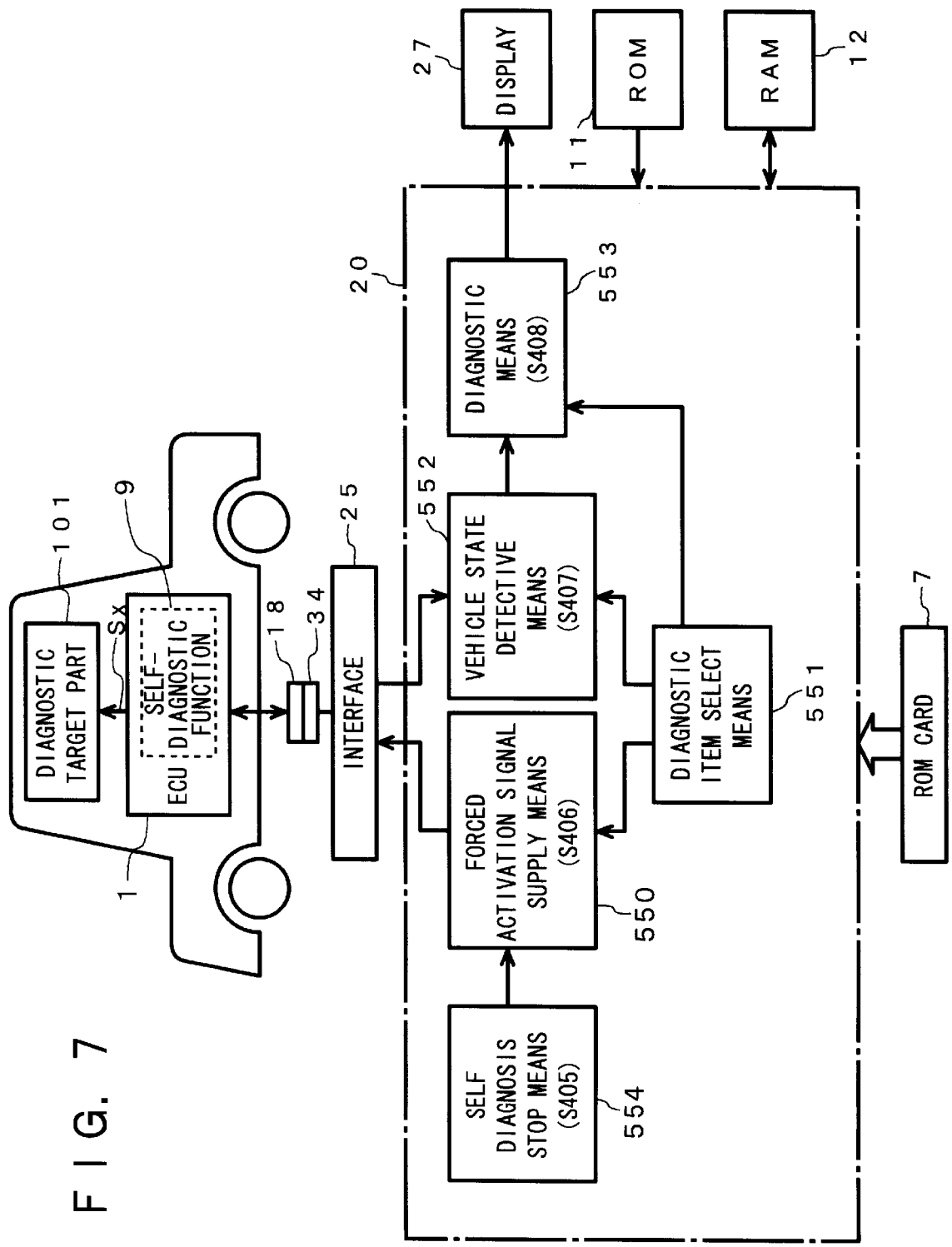
FIG. 7 is a functional block diagram of the vehicle diagnostic apparatus according to the present invention.
Figure 12:
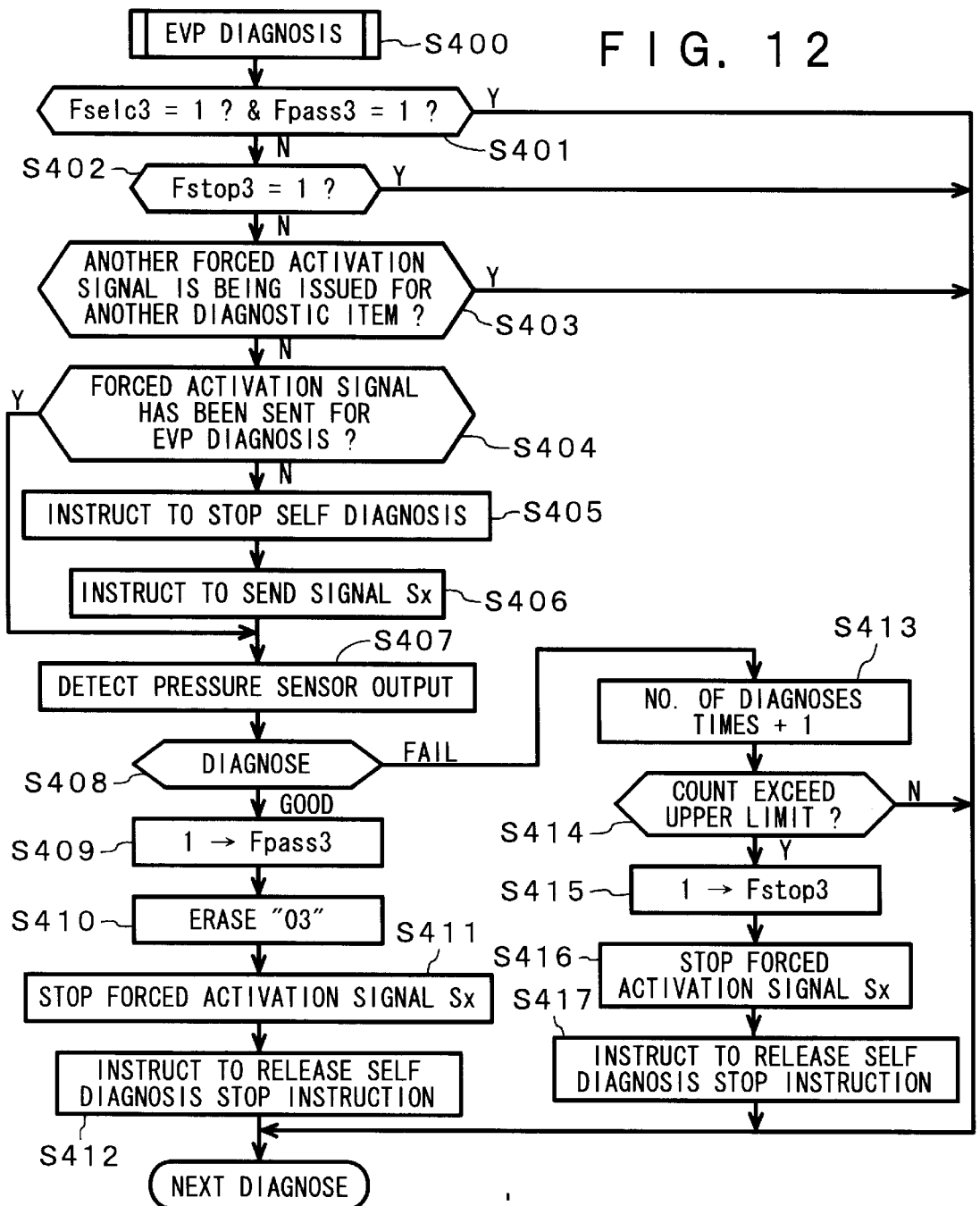
FIG. 12 is a flowchart showing an operation of an EVP diagnosis.

FIG. 12 is a flowchart showing method of "EVP Diagnosis" executed by the step S400 which uses forced activation signal. FIG. 7 is a functional block diagram for carrying out each vehicle diagnosis according to the present invention, in which like numbers represent identical or equivalent functional blocks, and step numbers given in each block correspond to those given in flowcharts, indicating the contents of processing to be executed by each block.

In FIG. 7, diagnostic-item selection means 551 selects a diagnostic item out of plural diagnostic items consecutively one by one for given cycles based on the diagnostic item management table 71 and the vehicle diagnostic program 72 each registered in the ROM card 7. Forced activation signal supplying means 550 supplies a forced activation signal Sx through the ECU 1 to a diagnostic target part 101 related to any one of diagnostic items ("EVP Diagnosis" or "Variable VT Diagnosis" in this embodiment) requiring a forced activation signal for execution of the diagnosis in the diagnostic items selected by the diagnostic item selection means 551. Vehicle-State detection means 552 detects through the vehicle-mounted ECU 1 a current state of each diagnostic target part 101 related to each diagnostic item selected by the diagnostic-item selection means 551.

Diagnostic means 553 compares the current state of the diagnostic target part 101 detected by the vehicle-state detection means 552 with a state predicted when the forced activation signal Sx is given, and judges the diagnostic target part 101 to be good when both states accord or an expected relation is established therebetween. The judgment result is displayed on the display 27.

When the forced activation signal Sx is supplied from the forced activation signal supplying means 550 to each related part of the vehicle through the ECU 1, self diagnosis stopping means 554 refers to, for example, a data table to recognize an item, the diagnostic result of which may vary under the influence of the forced activation signal Sx currently output, so as to instruct the self-diagnostic function part 9 to stop the self diagnosis related to the corresponding item. Thus, the self-diagnostic function part 9 stops the self diagnosis related to the item.

Figure 13:
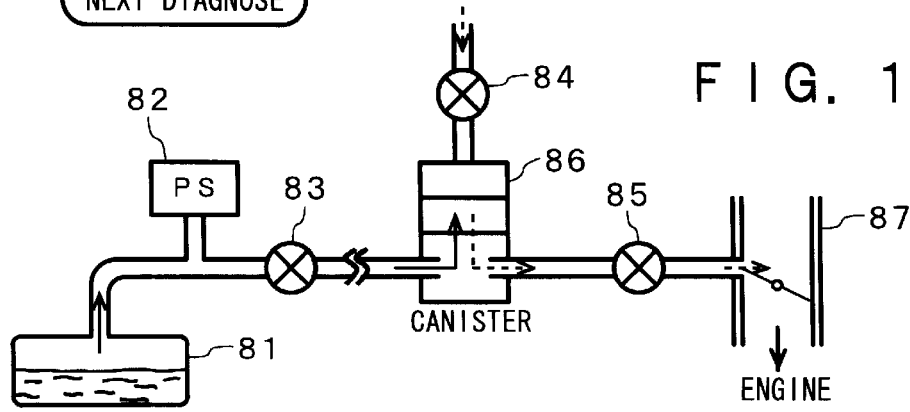
FIG. 13 is a block diagram of an evaporation system.

Referring now to the flowchart of FIG. 12 and the functional block diagram of FIG. 7, description will be made to a method of "EVP Diagnosis" related to the diagnostic item 3 according to the present invention. The "EVP Diagnosis" routine is to diagnose an evaporation system, as schematically illustrated in FIG. 13, for supplying the engine through a inspire pipe 87, when required conditions are satisfied during running of the vehicle, with fuel gas evaporated from fuel in a fuel tank 81 and collected in a canister 86.

In such an evaporation system, since the ECU 1 controls opening and closing of valves 83, 84 and 85, it is necessary to diagnose in the "EVP Diagnosis" routine whether or not each valve functions normally. The inspection process under limited conditions, however, makes it difficult to run the vehicle in such a manner that each valve in the evaporation system is normally actuated. In this regard, the embodiment is to send the forced activation signal from the ECU 1 to each valve such that each valve is forcibly opened or closed irrespective of the actual vehicle-running conditions. Then, pressure detected by a pressure sensor (PS) 82 is compared with pressure expected when each valve is opened or closed in accordance with the instruction of the forced activation signal. If both pressures agree, or an expected relation is established therebetween, each valve is diagnosed as being normal.

When the diagnostic-item selection means 551 selects the "EVP Diagnosis" of the step S400, it is judged in step S401 whether or not the diagnostic item is selected and said item has been judged to be passed, as is similar to the above, based on the values of the selection flag Fselc 3 and the pass flag Fpass 3 related to the diagnostic item 3. If the "EVP Diagnosis" is selected but has not passed yet, the processing advances to step S402, or otherwise, the operation advances to the next diagnostic processing. In step S402, a diagnosis stop flag Fstop 3 is referred to, and if the flag is set, the operation advances to the next diagnostic processing. If not set, the processing advances to step S403. The diagnosis stop flag Fstop 3 is set when the "EVP Diagnosis" has not passed after a predetermined number of executions or more has been done. Once the diagnosis stop flag Fstop 3 is set, the "EVP Diagnosis" is eliminated from the diagnostic targets.

In step S403, it is determined whether or not another forced activation signal for another diagnosis has already been sent from the ECU 1 to another diagnostic target part 101. Said another forced activation signal to be judged here is a forced activation signal supplied to a solenoid valve in the "Variable VT Diagnosis" routine in the present embodiment. If the determination at step S403 is negative, it is determined in step S404 whether or not the forced activation signal Sx for the "EVP Diagnosis" has already been sent out.

If the determination is negative, the self diagnosis stopping means 554 instructs the self-diagnostic function part 9 to temporarily stop the self diagnosis in step S405. Such instruction may be directed to the self-diagnostic function part 9 either to stop all the self diagnoses or to stop only the item the diagnostic result of which can vary under the influence of the forced activation signal Sx supplied for the "EVP Diagnosis".

In step S406, the forced activation signal supplying means 550 of FIG. 7 outputs an instruction to the ECU 1 in the "EVP Diagnosis" routine to output such a forced activation signal Sx as to open or close each valve 83–85 constituting the system. Then, the ECU 1 outputs the forced activation signal Sx to each valve 83–85 in accordance with the instruction.

In step S407, the value detected by the pressure sensor PS (FIG. 13) is read by the vehicle-state detection means 552. In step S408, the diagnostic means 553 makes a diagnosis of each valve based on whether or not the detected pressure value matches with a pressure value predicted from the state of each valve opened or closed by the forced activation signal Sx. If not diagnosed as being good, the counter 556 for counting the number of times the diagnosis is executed is incremented in step S413. Then, in step S414, it is determined whether or not the number of executions of the diagnosis exceeds a predetermined upper limit. If the determination is negative, the operation advances to the next diagnostic item (the "Variable VT Diagnosis" in this embodiment) along the flowchart of FIG. 8, and the "EVP Diagnosis" routine is held until the next diagnostic timing.

In future EVP diagnosis routines, once the diagnostic result at step S408 becomes good, "1" is set in the diagnostic pass flag Fpass 3 in step S409, and the diagnostic item number "03" is erased from the display 27 in step S410.

In step S411, the forced activation signal supplying means 550 stops supplying the forced activation signal Sx to the diagnostic target part 101. Then, in step S412, the self diagnosis stopping means 554 releases the self-diagnosis stopping instruction sent to the self-diagnostic function part 9 of the ECU 1 so that self-diagnostic function part 9 will restart the self diagnosis.

The counter 556 for counting the number of times the diagnosis is executed is incremented in step S413, each time the diagnosis at step S408 does not show a good result in the subsequent EVP diagnosis routines. Then, when it is determined in step S414 that the counter value exceeds the upper limit, the diagnosis stop flag Fstop 3 is set in step S415 to prevent the diagnosis from hindering other diagnosis routines using other forced activation signals. In step S416, the ECU1 stops supplying the forced activation signal Sx for actuating the diagnostic target part 101.

Then, in step S417, the self diagnosis stopping means 554 releases the self-diagnosis stopping instruction having been sent to the self-diagnostic function part 9 of the ECU 1 so that self-diagnostic function part 9 will restart the self diagnosis.

According to the embodiment, when supplying a forced activation signal to the vehicle, the external diagnostic apparatus 2 instructs the vehicle-mounted self-diagnostic function part 9 to stop the self diagnosis related to the item the diagnostic result of which can vary under the influence of the forced activation signal. This makes it possible to prevent the self-diagnostic function from wrongly diagnosing a relating diagnostic part even when the part shows a state different from a normal state under the influence of the forced activation signal.

Figure 14:
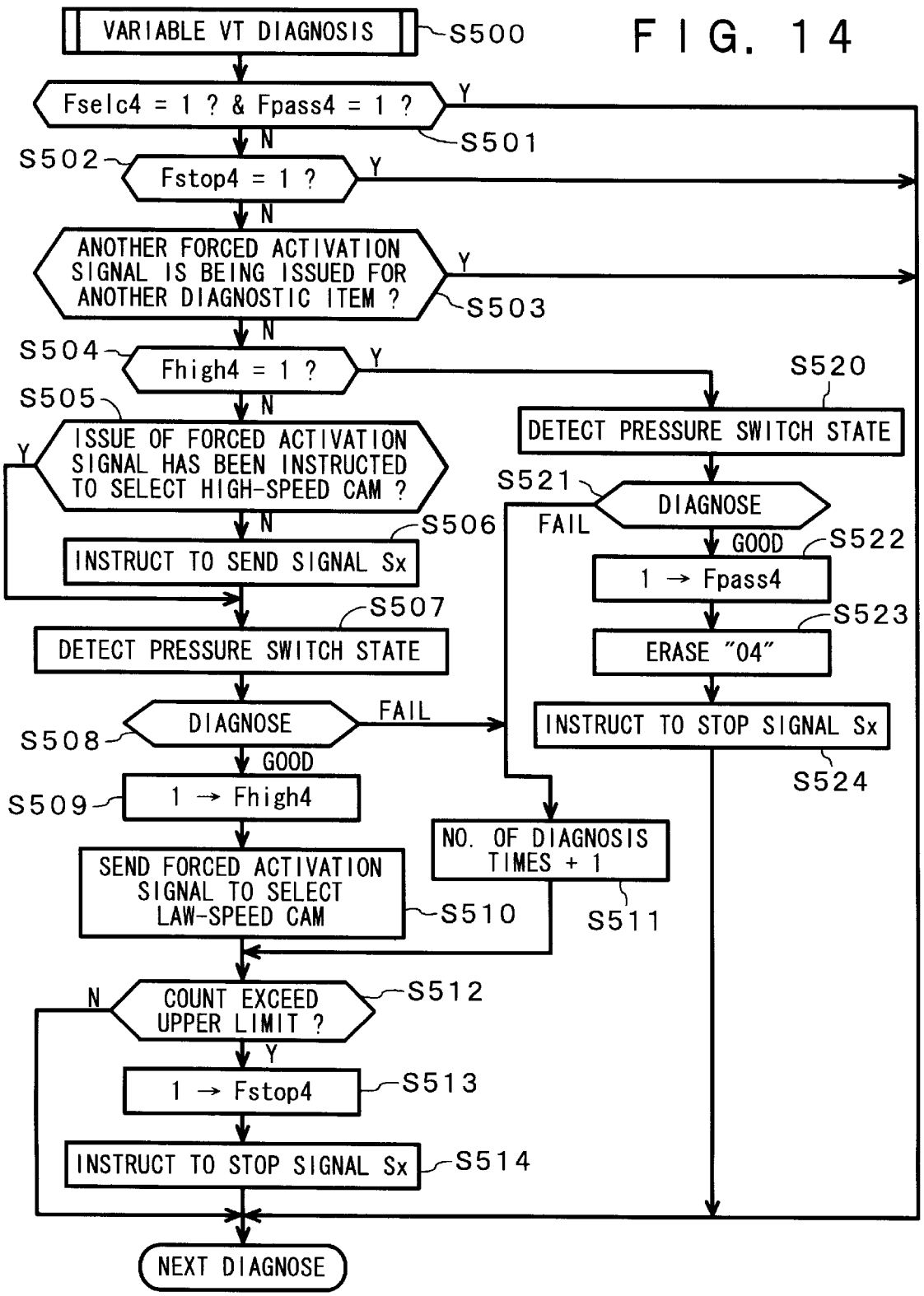
FIG. 14 is a flowchart showing an operation of a VT diagnosis.

FIG. 14 is a flowchart showing a method of "Variable VT Diagnosis" executed by the step S500. As is similar to the "EVP Diagnosis," this diagnosis is executed using a forced activation signal. The "Variable VT Diagnosis" routine is to diagnose a function for switching the valve opening and closing timing or the amount of valve lift to either of high-speed and low-speed operations according to various conditions such as the vehicle-running speed and the engine speed.

The vehicle engine is generally provided with two types of cams different in shape for each cylinder. The valve opening and closing timing, and/or the amount of valve lift, is changed by switching the cam to be actuated. For example, a solenoid valve may serve to switch the destination to which oil pressure is to be supplied, thus switching the cam from one to the other and vice versa. The solenoid valve is controlled to supply the oil pressure to a high-speed hydraulic system when the high-speed cam is to be actuated, and to block the oil pressure to the high-speed hydraulic system when the low-speed cam is to be actuated. For this reason, in the "Variable VT Diagnosis" routine, it is determined whether or not the solenoid valve is controlled correctly in accordance with the instruction. Specifically, the determination is made based on whether or not a hydraulic responding switch provided in the hydraulic system is correctly opened or closed.

As is similar to the "EVP Diagnosis" routine, the inspection process under limited conditions, however, causes difficulties in continuing stable running at such a high speed as to switch the valve timing or the like for a period necessary to execute the diagnosis. In this regard, the embodiment is to send a forced activation signal from the ECU 1 to the solenoid valve so as to forcibly switch the cam irrespective of the actual vehicle-running conditions. Consequently, it is determined whether or not the pressure responding switch is actuated accurately to select the cam in accordance with the instruction on the basis of the pressure detected by the sensor.

When the diagnostic-item selection means 551 of FIG. 7 selects the "Variable VT Diagnosis", it is judged in step S501 whether or not the diagnostic item is selected and the item has been passed, as is similar to the above, based on the values of the selection flag Fselc 4 and the pass flag Fpass 4 related to the diagnostic item 4. If the "Variable VT Diagnosis" is selected, but has not passed yet, the processing advances to step S502, or otherwise, the operation advances the next diagnostic processing. In step S502, a diagnosis stop flag Fstop 4 is referred to, and if the flag is set, the operation advances to the next diagnostic processing. If not set, the processing advances to step S503. The diagnosis stop flag Fstop 4 is set in step S513, as will be described later, when the "Variable VT Diagnosis" has not passed after a predetermined number of executions has been done (or predetermined time has elapsed).

In step S503, it is determined whether or not another forced activation signal for another diagnosis has already been sent from the ECU 1 to another diagnostic target part 101. If the determination is negative, it is determined in step S504 whether or not a high-speed diagnostic flag Fhigh 4 is set. The high-speed diagnostic flag Fhigh 4 is set when the diagnosis for the high-speed cam is completed. At first, since the high-speed diagnostic flag Fhigh 4 is not set, the processing advances to step S505 in which it is determined whether or not the ECU 1 has already sent the forced activation signal Sx for actuating the solenoid valve so as to select the high-speed cam. If the determination is negative, the forced activation signal supplying means 550 outputs an instruction to the ECU 1 in step S506 to output the forced activation signal Sx.

In step S507, an opened or closed state of a pressure switch provided in the hydraulic system of the high-speed cam is detected. The pressure switch is designed to open its contact when oil pressure applied into the system is equal to or over a prescribed value. When the opened state is detected, therefore, the diagnostic means 553 diagnoses it as being good in step S508, and the processing advances to step S509 in which the high-speed diagnostic flag Fhigh 4 is set. Then, in step S510, the forced activation signal that has forcibly been actuated the solenoid valve to select the high-speed cam is stopped, while another forced activation signal for forcibly actuating the solenoid valve to select the low-speed cam is sent out.

When the opened state is not detected in the step S507, the diagnostic means 553 reaches a bad diagnostic result in step S508, and the processing advances to step S511. In step S511, the counter 556 for counting the number of times the "Variable VT Diagnosis" is executed is incremented in the same manner as in the above case. Then, in step S512, it is determined whether or not the number of executions of the diagnosis exceeds an upper limit. If not exceed the upper limit yet, the operation advances to the next diagnostic item (the "Ne Diagnosis" of diagnostic item 5 in this embodiment) along the flowchart of FIG. 8, and the "Variable VT Diagnosis" routine is held until the next diagnostic timing.

In the case where the forced activation signal for selecting the low-speed cam is output in step S510, the processing of FIG. 14 advances from step S504 to step S520 at the next diagnostic timing. In step S520, an opened or closed state of a pressure switch provided in the hydraulic system of the low-speed cam is next detected. Then, in step S521, the diagnosis is executed in the same manner. If not diagnosed as being good, the processing advances to step S511 in which the number of executions of the diagnosis is incremented. If diagnosed as being good, on the contrary, "1" is set in the diagnostic pass flag Fpass 4 in step S522, and the diagnostic item number "04" is erased from the display 27 in step S523. Then, in step S524, the supply stopping means 555 instructs the forced activation signal supplying means 550 to stop supplying the forced activation signal Sx.

The counter 556 that counts the number of times the diagnosis is executed is incremented each time the diagnosis at step S521 shows a bad result at any future diagnostic timing. Then, when it is determined in step S512 that the counter value exceeds the upper limit, "1" is set in the diagnosis stop flag Fstop 4 in step S513 in the same manner as in the above. Then, in step S514, the supply stopping means 555 instructs the forced activation signal supplying means 550 to stop supplying the forced activation signal Sx.

Figure 15:
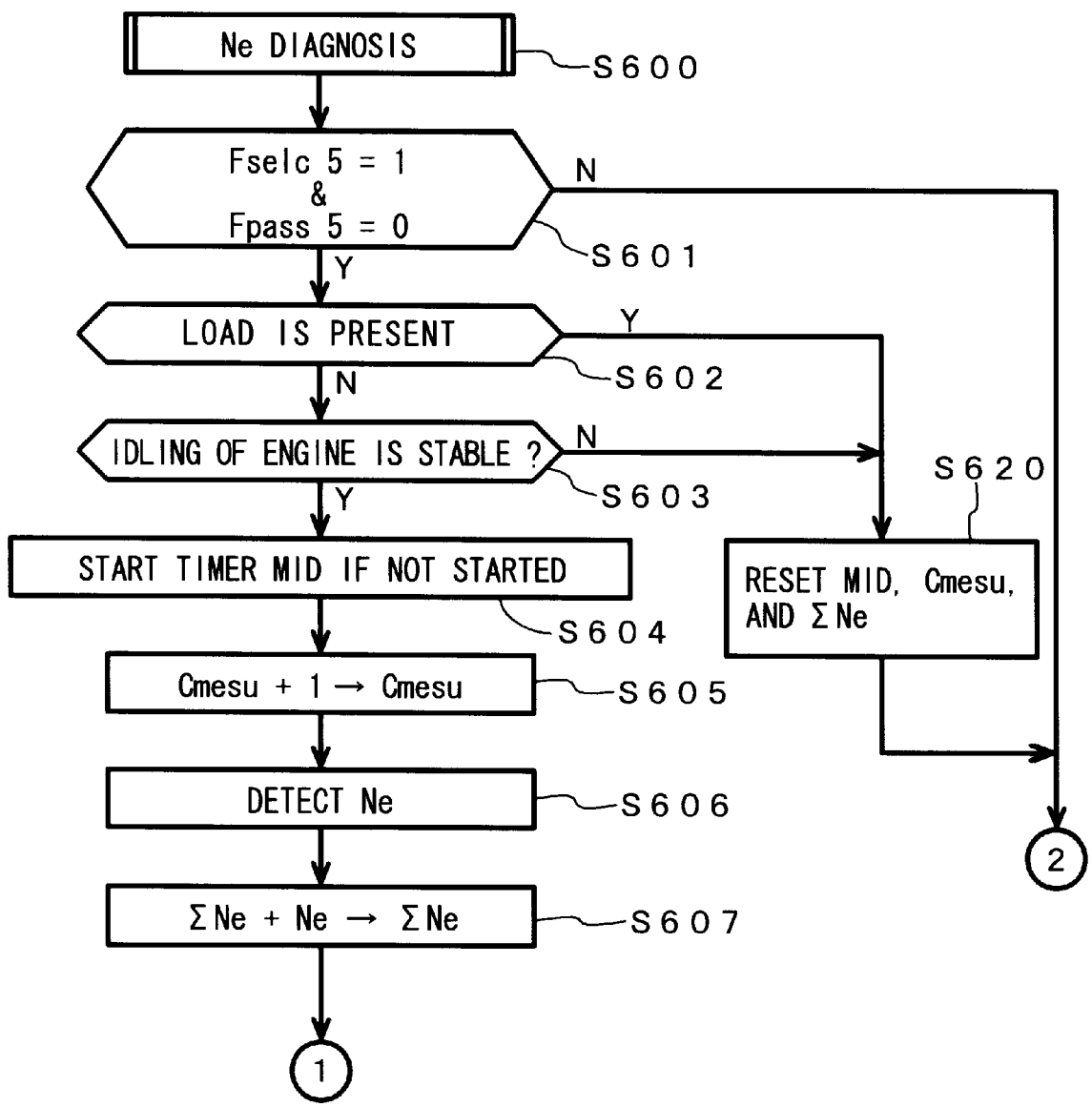
FIGS. 15 and 16 show a flowchart of an Ne diagnosis when combined each other.
Figure 16:
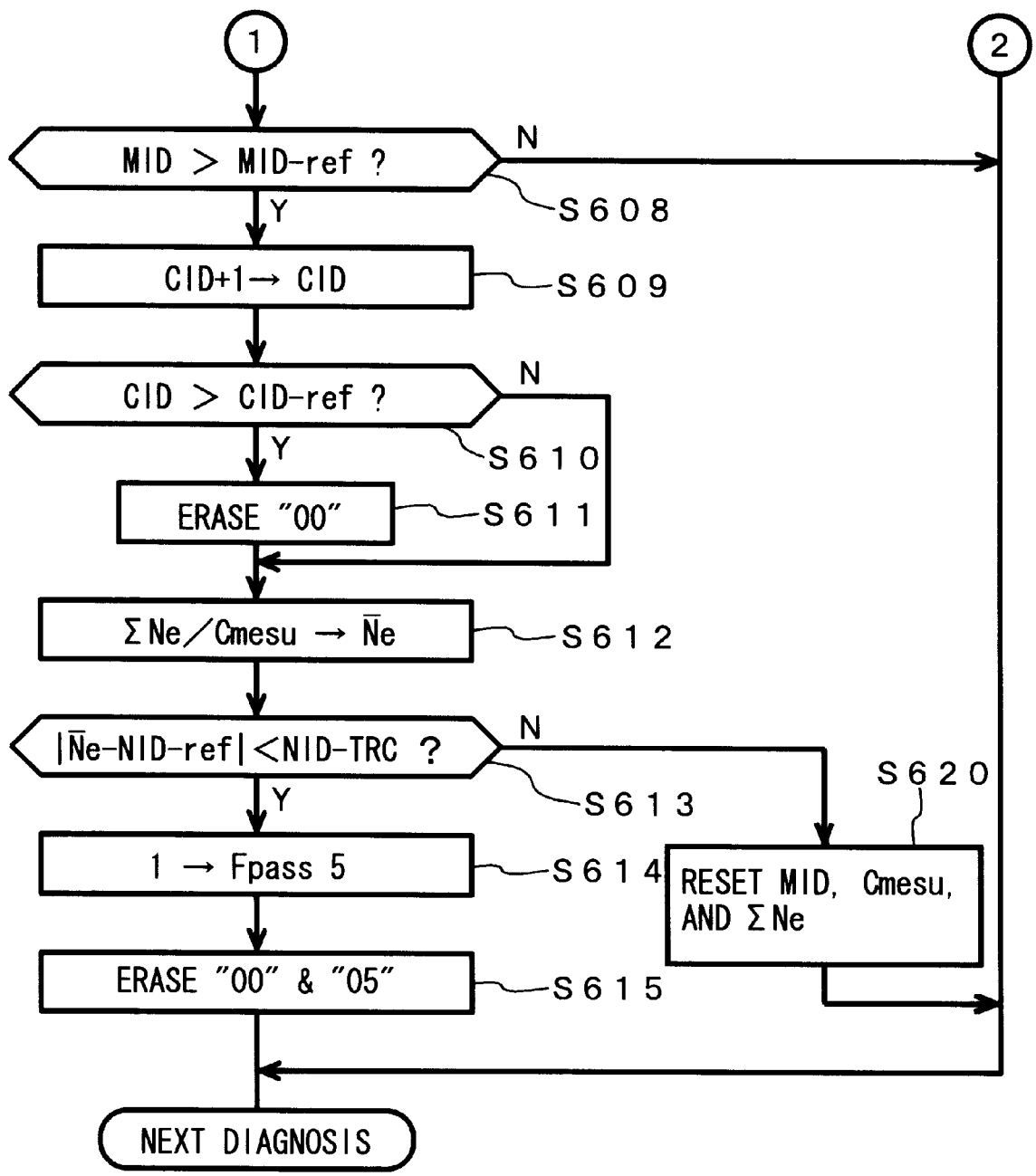

FIGS. 15 and 16 are flowcharts showing a method of the diagnostic item 5 "Ne Diagnosis" executed by the step S600 of FIG. 8. The "Ne Diagnosis" routine is to diagnose whether the engine speed at idling time is normal or abnormal, in which the engine speed Ne during the idling time is compared with a reference value (having the tolerance NID-TRC) to diagnose the engine speed Ne in accordance with the comparison result.

As similar to the above-mentioned diagnostic items, step S601 determines whether or not the diagnostic item 5 has been selected and the diagnosis has been passed based on the values of the diagnostic selection flag Fselc 5 and the diagnostic pass flag Fpass 5 related to the diagnostic item 5. If the "Ne Diagnosis" has been selected (Fselc 5=1) but not yet be passed (Fpass 5=0), the program advances to step S602. Otherwise, the program advances to a next diagnosis item.

The step S602 determines whether or not the engine is loaded. The engine is loaded when any of the electrical equipments are turned on or a power steering is operated. "Ne Diagnosis" is judged to be passed when a difference between the detected idling speed Ne and a target value thereof is smaller than a predetermined reference value. However, the application of the load having the effect on the engine speed, such as an engine load or a electrical load, requires engine control so as to overcome the load, where the idling speed is set higher than usual, and this makes it difficult to diagnose the idling speed accurately. Therefore, the present embodiment has step S602 to determine whether the load is present or absent prior to the "Ne Diagnosis". If the load is detected, the program advances to step S620 without execution of the Ne diagnosis, in which variables such as in a timer MID, a number of times of accumulating Cmesu, and an accumulated value ΣNe, which are described later, are reset. After that, the program advances to the next diagnosis item. On the other hand, if the load is not detected, the program advances to step S603, in which it is determined whether or not the idling of engine is stable. If not stable, the program advances to step S620, and if stable, it advances to step S604.

When the idling of engine is stable and the diagnosis starting conditions are satisfied, the step S604 judges an operating state of the timer MID. If the timer MID has not been started yet, it will be started. Step S605 increases the number of accumulation times Cmesu by 1 (one). In Step S606, the value of a current engine speed Ne is received from the ECU 1 and in step S607, the engine speed Ne detected in the current "Ne Diagnosis" cycle is added to the last accumulated value ΣNe. The resultant sum value is then registered as a new accumulated value ΣNe.

In the subsequent step S608 of FIG. 16, the value of timer or counter MID is compared with a reference idling measurement time MID-ref stored as a data piece of the standard data. If the value of the counter MID reaches the MID-ref, the measurement time required for the "Ne Diagnosis" is regarded as having already been elapsed and the program advances to step S609, in which the number of times of idling diagnoses CID is increased by 1 each time the idling diagnosis is executed. Then, step S610 compares the number of times of idling diagnoses CID with a predetermined reference number of times of idling diagnoses CID-ref stored as a data piece of the standard data.

If the number of times of idling diagnoses CID reaches the reference number of times of idling diagnoses CID-ref, the number of measurement times is regarded as being enough for the diagnosis. Therefore, step S611 erases the number "00" from the display 27. The subsequent step S612 divides the accumulated value ΣNe of the engine speed Ne by the number of times of accumulating Cmesu to calculate the average value of the engine speed Ne.

In step S613, an absolute value of a difference between the average value of the engine speed Ne and the unique data NID-ref is compared with the idling tolerance NID-TRC stored as a data piece of the standard data. If the absolute value is equal to, or smaller than the idling tolerance NID-TRC, the idling of engine is diagnosed as being normal and the program advances to step S614. On the other hand, if the absolute value exceeds the idling tolerance NID-TRC, the idling of engine can not be diagnosed as being not normal at this stage and the program advances to step S620. In the step S620, variables such as the timer MID, the number of times of accumulating Cmesu, and the accumulated value ΣNe are reset, and the program advances to the next diagnosis. The step S614 sets "1" as the diagnostic pass flag Fpass 3 related to the "Ne diagnosis", and the subsequent step S615 erases the diagnostic item number "05" (and the numbers "00" and "05"if "00" remains) from the display 27.

As previously described, the present embodiment accumulates the engine speed Ne detected as the "Ne diagnosis" routine is repeatedly executed, to calculate the average value of the engine speed based on the accumulated value ΣNe. Since the engine speed Ne is diagnosed based on whether or not the average value of the detected Ne's is within the reference range, the "Ne diagnosis" can be executed efficiently even using a diagnostic method of repeatedly circulating plural types of diagnoses for a very short period of each execution cycle.

Figure 17:
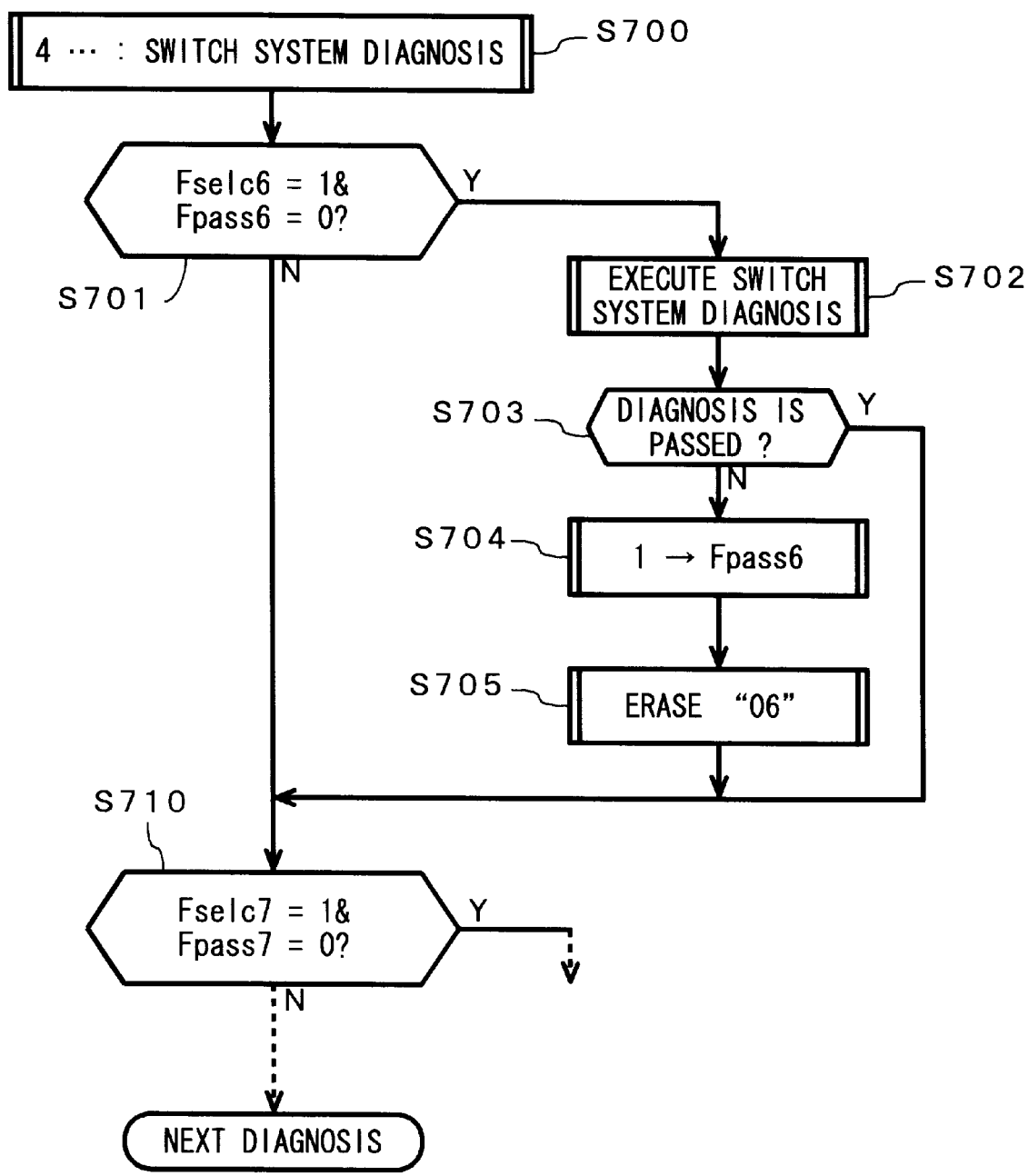
FIG. 17 is a flowchart showing an operation of each switch system diagnosis.

FIG. 17 is a flowchart showing a method of diagnosing each switch in a switch system, which is related to the diagnostic items 6, 7, . . . to be executed by the step S700 of FIG. 8. In the "Switch system diagnosis", each switch is diagnosed as being passed when both of on- and off-states of the switch to be diagnosed are detected.

As similar to the above cases, step S701 determines whether or not the diagnostic item 6 has been selected and the diagnosis has been passed based on the values of the diagnostic selection flag Fselc 6 and the diagnostic pass flag Fpass 6 related to a "Brake Switch Diagnosis". If the "Brake Switch Diagnosis" is selected (Fselc 6=1) but not yet be passed (Fpass 6=0), the program advances to step S702 in which the diagnoses are conducted about both of on- and off-states of the brake switch. Step S703 determines whether the diagnosis is passed or failed. If both of the on- and off- states has passed, step S704 sets the diagnostic pass flag Fpass 6 to "1" and step S705 erases the diagnostic item number "06" from the display 27. If the judgements in the Steps 701 and 703 are negative, the program advances to step S710, in which the next switch diagnosis (diagnostic item 7) is executed. Similarly, other switches are diagnosed in the same manner as above mentioned, and respective numbers of the passed diagnostic items are erased from the display 27 in due order.

Figure 18:
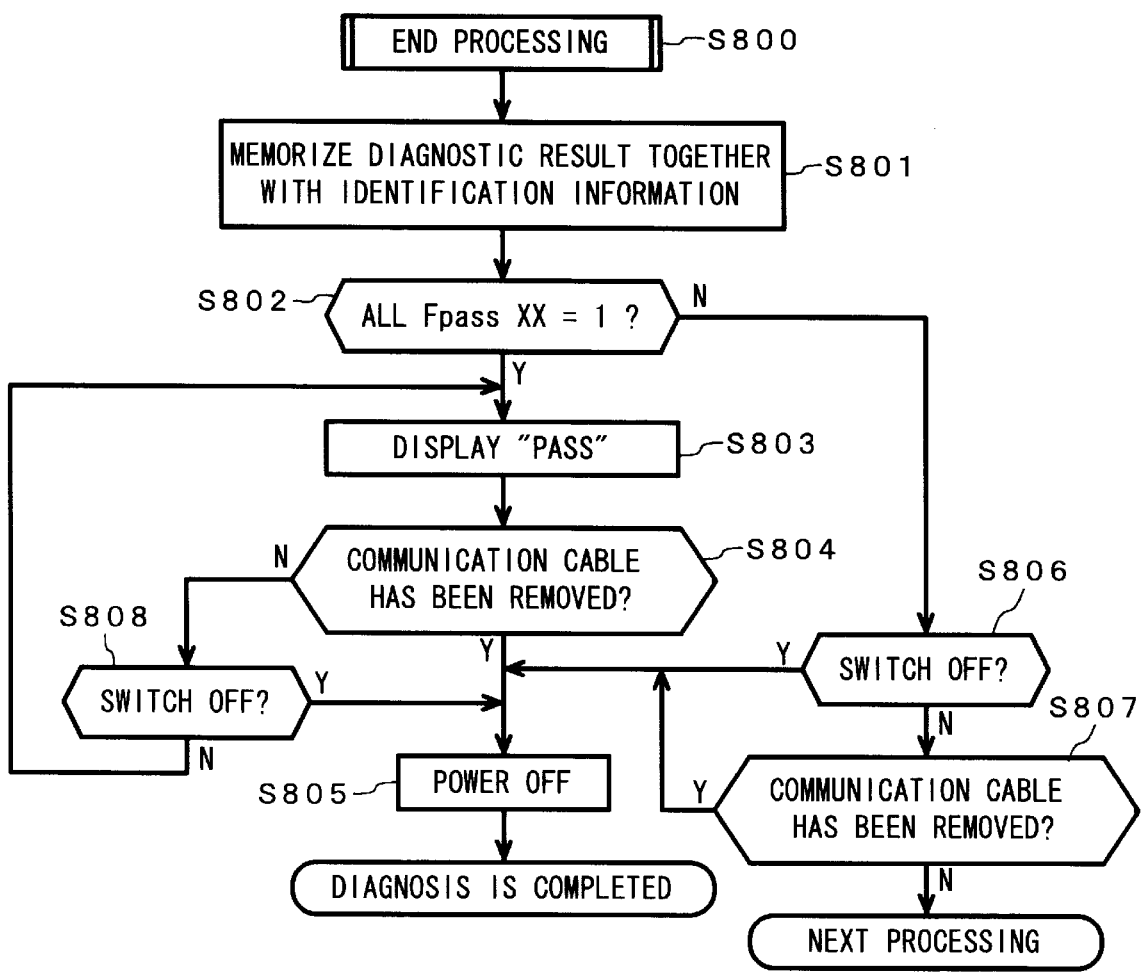
FIG. 18 is a flowchart showing an operation of an end processing.

FIG. 18 is a flowchart showing the "End Processing" (step S800) of FIG. 8. In the first step S801, the current diagnostic results, such as the number of the diagnostic item that each diagnosis has not been passed yet, are stored into the RAM 22 (FIG. 1) in correspondence with each individual identification code of the vehicle read in the step S114 of FIG. 9. The diagnostic results are rewritten or replaced by a new diagnostic results each time the step S501 is executed.

The RAM 22 shown in FIG. 1 is able to store the diagnostic results of plural vehicles in correspondence with respective identification codes. When the diagnostic results of plural vehicles, e.g., 50 or 60 vehicles, are stored, they are put into a single data set and transferred by radio through the transmitter 24 to the host machine, such as the host computer 30, automatically or by the operator manually selecting a "Transfer" from the menu on the display screen. In the host computer 30, a plurality of data sets, each representing the diagnostic results transferred in the plural data sets, are then incorporated into one unit and stored into the storage device 33. When storing data of predetermined units, e.g., for several hundreds vehicles, the data is memorized into a removable, portable storage medium such as an IC card or a floppy disk.

Such a batch processing in managing the diagnostic results of each individual vehicle makes it possible not only to improve the work efficiency of the operator, but also to simplify the process of taking statistics of the diagnostic results. It is therefore possible to analyze the diagnostic results and feed back the analysis result to the production process immediately.

The step S802 of FIG. 18 refers to all the diagnostic pass flags Fpass XX to determine whether all the diagnostic items are passed or not. In the case where all the diagnostic pass flags Fpass XX are set to "1", step S803 makes the display indicate a word "Pass", as shown in FIG. 6F, to inform the operator that all the diagnoses are completed. Step S804 determines whether or not the communication cable 5 has been removed from the ECU 1, and if removed, the vehicle diagnostic apparatus 2 is turned off in step S805. On the other hand, if not removed, step S808 determines whether or not the power has been inactivated by the operator's turning off the power-off key switch. After the key operation by the operator, the program advances to step S805. Otherwise, the program returns to the step S803.

In the case where at least one of the diagnostic items, e.g., the diagnostic item 2, is not judged to be passed in the step S802, the program advances to step S806. In this case, since the number "02" remains on the display 27, as shown in FIG. 6C, the operator can easily recognize that only the diagnostic item 2 has not been passed yet.

When the diagnostic item number "05" related to the "Ne Diagnosis" remains on the display 27, as shown in FIGS. 6D and 6E, the validity of the fail result in the diagnostic item 5 are judged based on whether or not the number "00" remains on the display 27. As previously described by referring to the steps S610 and S611 of FIG. 16, the indication of "00" is erased when the diagnosis starting conditions for the diagnostic item 5, such as the conditions that the engine is warmed up adequately without any load, are satisfied, and the number of times the Ne diagnosis is executed (CID) exceeds a given number (CID>CID-ref). If the indication of "00" remains, as shown in FIG. 6D, therefore, it means that the diagnostic condition is not satisfied yet. Thus, the operator do not immediately judge the diagnostic item 5 to be bad or failed, but further execute the Ne diagnosis. If the numbers "00" and "05" are erased after that the diagnostic item 3 is judged to be passed.

In the case where the number "00" has already been erased, as shown in FIG. 6 E, the operator immediately judges the diagnostic item 3 to be failed because the diagnostic item 5 has not been passed yet in spite of the situation that the preconditions are satisfied and the number of times of diagnoses (CID) reaches an adequate value.

As described above, with the diagnostic item requiring certain preconditions to be satisfied before starting the diagnosis, the vehicle diagnostic apparatus 2 in the present embodiment displays a fail number (an unsatisfied precondition sign) "00" indicated when the preconditions are not satisfied. In the case where such a fail number "00" appears on the display, therefore, the operator can easily recognize that the fail result of the diagnostic item is caused by unsatisfied preconditions even when the diagnostic item has not been passed yet, thus eliminating an error of fail judgment on a diagnostic item that may be passed.

The step S806 determines whether or not the operator has turned off the power switch. If the power switch has been turned off, the program advances to step S805 to turn off the diagnostic apparatus 2. If the power switch has not been turned off, step S807 determines whether or not the communication cable 5 has been removed from the ECU 1. If removed, the program advances to the step S805, in which the vehicle diagnostic apparatus 2 is turned off. If not removed, the program advances to the next process to continue this vehicle diagnostic program.

Figure 19:
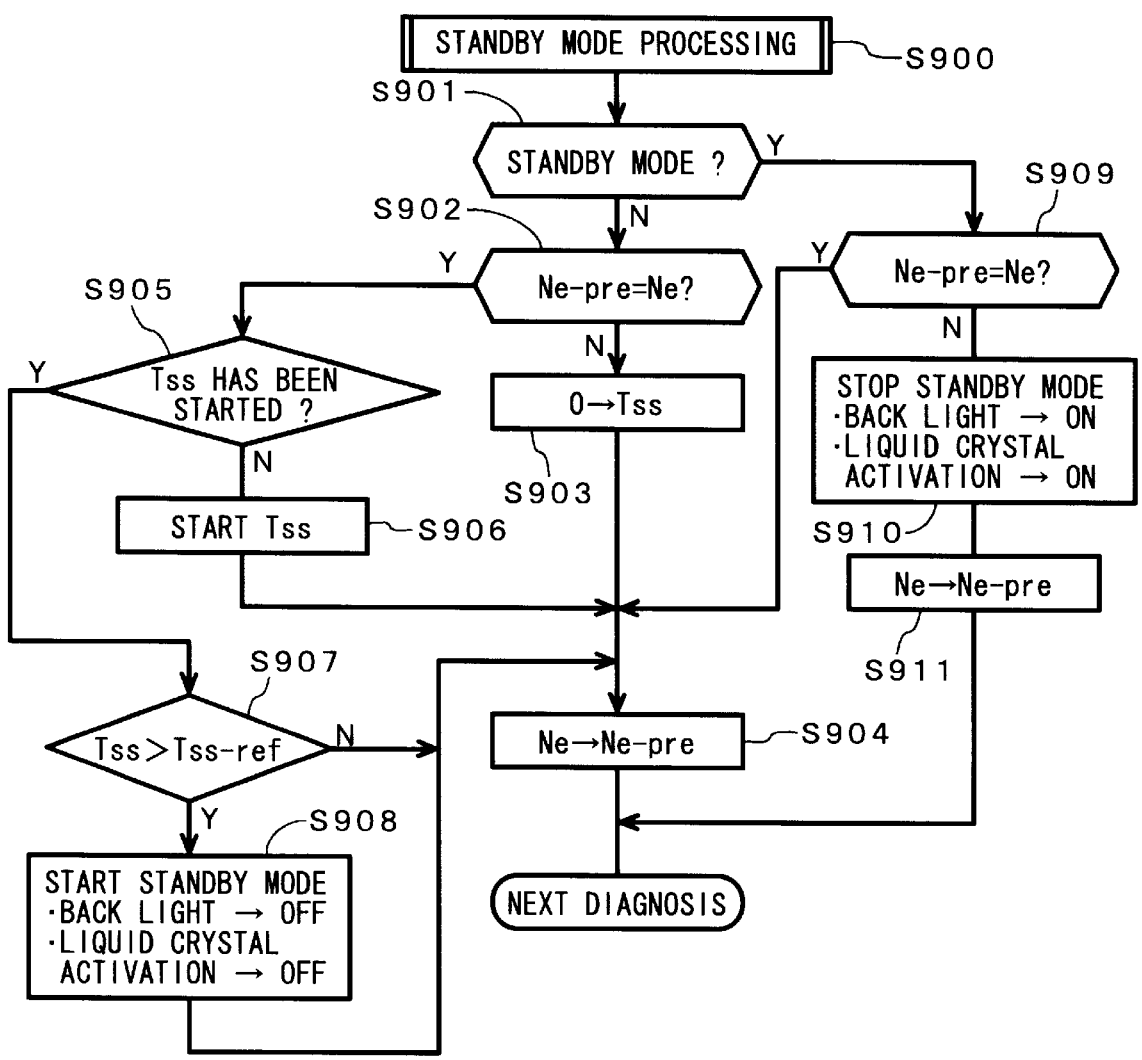
FIG. 19 is a flowchart showing an operation of a standby mode processing.

FIG. 19 is a flowchart showing an operation of a "Standby Mode Processing" to be executed by the step S900 of FIG. 8. The first step S901 in FIG. 16 determines whether or not the vehicle diagnostic apparatus 2 is in a diagnostic mode. Since it is in the standby mode in the first execution cycle, the program advances to step S902. The step S902 compares the previously-detected engine speed Ne-pre with a currently-detected engine speed Ne. If the diagnostic process is being executed, i.e., if the engine is running, since the engine speed must slightly fluctuate even in an idling state, both data on the engine speed are usually judged to be not equal. After the judgment, the program advances to step S903, in which a standby mode timer Tss is reset. The subsequent step S904 newly registers the currently-detected engine speed Ne as the previous engine speed Ne-pre, and the program advances to the next diagnosis item which is the "Vehicle Speed Sensor" diagnosis in the present embodiment.

Once the operator has stopped the engine such as for taking a rest, since the judgement in Step S902 is affirmative, the program advances to step S905. The step S905 determines whether or not the timer Tss is started counting. Since the timer Tss is not started counting in the first execution cycle, the program advances to step S906, in which the timer Tss is set to start.

After starting the standby timer Tss, since an affirmative judgement is obtained in the step S905, the program advances from the step S905 to step S907. The step S907 compares the count value of the timer Tss with a standby mode starting condition Tss-ref stored as a data piece of the standard data. If the count value exceeds the starting condition Tss-ref (i.e., when the engine stop judgement is continuously obtained for a predetermined period of time in Step S902), step S908 switches the operation mode from the diagnostic mode to the standby mode to turn off the back light of the display 27 and inactivate the liquid crystal. Further, a sequence of diagnostic processes that have been done up to that point are temporarily stored into the RAM 22.

Once starting the standby mode, the program advances from the step S901 to step S909 which compares the current engine speed Ne with the previous engine speed Ne-pre. During a recess, since both data on the engine speed always agree with each other without fail, and an affirmative judgement is obtained in the step S909, the standby mode is maintained. When the engine is restarted after the recess, since both data on the engine speed are judged to be not equal in the step S909, the program advances to step S910. The step S910 switches the operation mode from the standby mode to the diagnostic mode to turn on the back light of the display 27 and activate the liquid crystal. At the same time, the diagnostic history at starting of the standby mode is read out from the RAM 22, and the display contents just before starting the standby mode are reproduced on the display 27. Then, step S911 newly registers the currently-detected engine speed Ne as the previous engine speed Ne-pre. After that, the program returns to the "Vehicle Speed Sensor Diagnosis" described with reference to FIG. 10. A sequence of the above diagnosis routines are then repeatedly circulated as shown in FIG. 8.

The procedure shown in FIG. 19 may be modified as follows: (1) the processing shifts from step S908 to S901; (2) the processing shifts to step S901 when the judgment at step S909 is affirmative; and (3) the processing shift from step S910 to step S904 without passing through step S911.

As previously described, according to the embodiment, switching from the diagnostic mode to the standby mode is automatically done when the variation of engine speed is no longer detected, while switching from the standby mode to the diagnostic mode is automatically done when a change in engine speed is detected. Therefore, the operator has only to stop the engine when stopping the vehicle diagnosis temporarily for taking a rest, or to restart the engine when restarting the vehicle diagnostic program after the recess, without any other operation required. This allows the operator to be released from an excess load at switching from the diagnostic mode to the standby mode, and vice versa.

Although the embodiment described the vehicle diagnostic method and apparatus for use at a factory, such as in the "inspection process" on the production line, the present invention is not limited by the embodiment and may also be applied to vehicle diagnostic method and apparatus used under any other environments, such as at an auto repair shop.

In the above embodiment, diagnoses for plural items are repeatedly circulated in a very short period irrespective of the pass/fail diagnostic result, and only a diagnostic item or items that remain not passed after scheduled time has elapsed is diagnosed as being failed, but the present invention is not limited by the embodiment and can also be applied to any vehicle diagnostic method and apparatus as long as they are to make a diagnosis of vehicles by supplying a forced activation signal from the outside independently of the self-diagnostic function.

Figure 20:
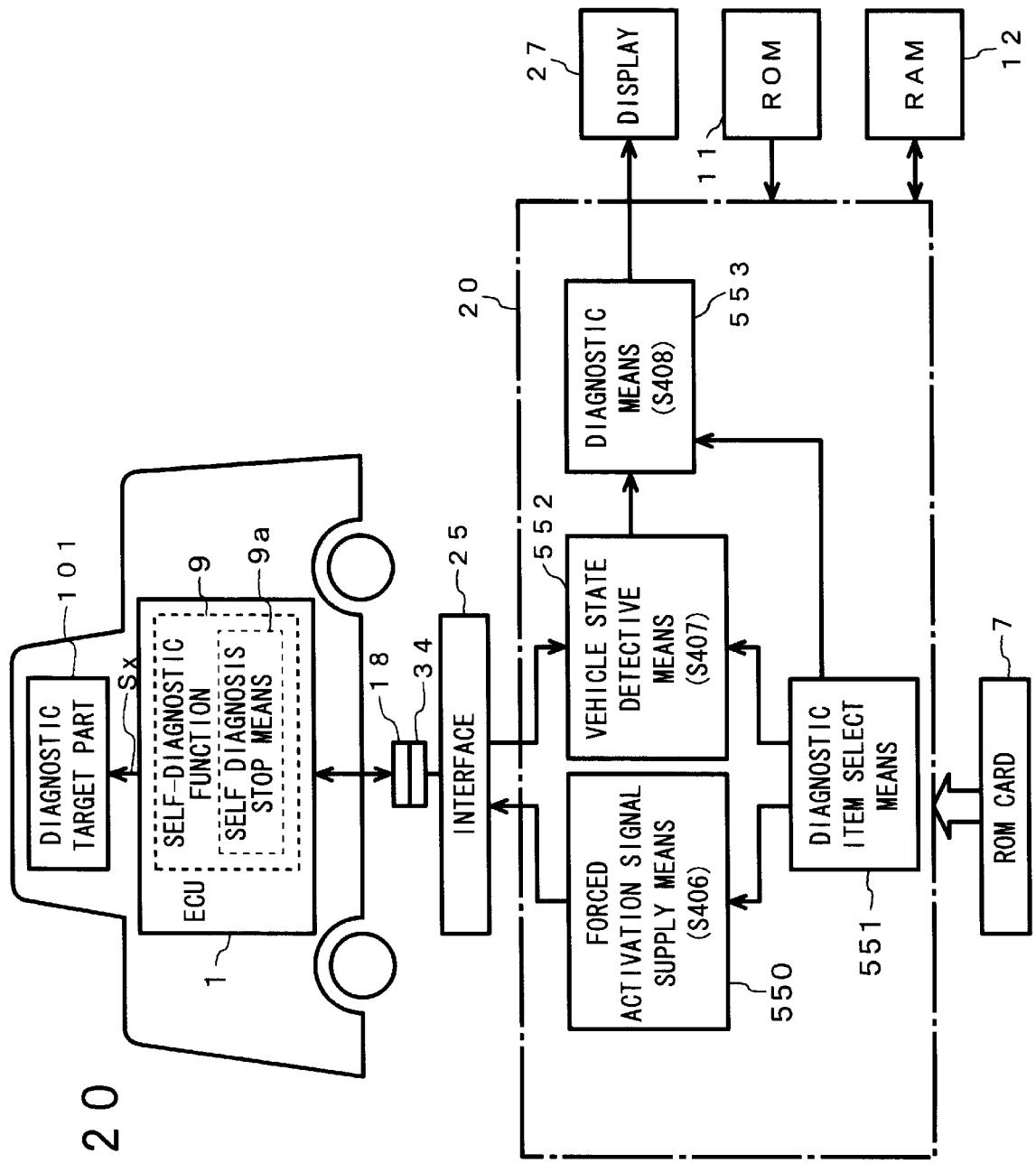
FIG. 20 is a functional block diagram of a second embodiment according to the present invention.

Although in the above embodiment the external diagnostic apparatus sends the self-diagnostic function part 9 of the ECU 1 an instruction for stopping a self diagnosis, the present invention is not limited by the embodiment. FIG. 20 shows a second embodiment of the present invention, in which reference numbers common to those in FIG. 7 represent equivalent parts. As shown in FIG. 20, self diagnosis stopping means 9a is provided in the self-diagnostic function part 9 so that the self-diagnostic function part 9 itself positively detects supplying of a forced activation signal. This allows the self-diagnostic function part 9 to stop the self diagnosis or make the diagnostic result ineffective.

INDUSTRIAL APPLICABILITY

According to the present invention, when an external diagnostic apparatus supplies a forced activation signal to a vehicle provided with a self-diagnostic function part, a self diagnosis for at least an item the diagnostic result of which can vary under the influence of the forced activation signal is stopped. This makes it possible to prevent the self-diagnostic function from wrongly diagnosing each diagnostic part as having trouble based on the state of the part even when the part shows a state different from a normal state under the influence of the forced activation signal.

What is claimed is:

1. A vehicle diagnostic method for supplying a forced activation signal from the outside to a predetermined part of a vehicle provided with a self-diagnostic function to make external diagnosis independent of self diagnosis based on whether or not an actually detected state of the vehicle is in a state predicted corresponding to the forced activation signal, comprising:

inhibiting a self diagnosis for at least an item the diagnostic result of which may vary under the influence of the forced activation signal during executing the external diagnosis.

2. A vehicle diagnostic apparatus for supplying a forced activation signal from the outside to a predetermined part of a vehicle provided with a self-diagnostic function to make external diagnoses independent of self diagnoses based on whether or not an actually detected state of the vehicle is in a state predicted corresponding to the forced activation signal, comprising:

forced activation signal supplying means for supplying a forced activation signal to a diagnostic target part related to a corresponding diagnostic item;

state detection means for detecting a current state of the diagnostic target part;

diagnostic means for comparing the currently detected state of the diagnostic target part with the state predicted when the forced activation signal is supplied thereto to make a diagnosis of the diagnostic target part; and self-diagnosis stopping instruction means for giving the self-diagnostic function an instruction to stop a self diagnosis during supplying of the forced activation signal.

3. The apparatus according to claim 2, further wherein said self-diagnosis stopping instruction means stops the self diagnosis only for an item the diagnostic result of which may vary under the influence of the forced activation signal currently output.

4. A diagnostic apparatus mounted on a vehicle for diagnosing each part of the vehicle, comprising:

means for detecting input of a forced activation signal from the outside of the vehicle so that each part of the vehicle will forcibly be actuated for an external diagnosis, and self-diagnosis stopping means responding to detection of input of the forced activation signal for stopping at least a self diagnosis for an item the diagnostic result of which may vary under the influence of the forced activation signal.

5. A diagnostic apparatus mounted on a vehicle for diagnosing each part of the vehicle, comprising:

means for detecting input of a forced activation signal from the outside of the vehicle so that each part of the vehicle can forcibly be actuated for an external diagnosis, and means responding to detection of input of the forced activation signal for invalidating at least a result of self diagnosis for a diagnostic item which may vary under the influence of the forced activation signal.

* * * * *